(12) United States Patent  (10) Patent No.: US 8,346,048 B2
Bita et al.  (45) Date of Patent: Jan. 1, 2013

(54) FRONT LIGHT DEVICES AND METHODS OF FABRICATION THEREOF

(75) Inventors: Ion Bita, San Jose, CA (US); Gang Xu, Cupertino, CA (US); Kollengode S. Narayanan, Cupertino, CA (US); Russell W. Gruhlke, Milpitas, CA (US); Marek Mienko, San Jose, CA (US); Lai Wang, Milpitas, CA (US)

(73) Assignee: Qualcomm Mems Technologies, Inc., San Diego, CA (US)

( * ) Notice: Subject to any disclaimer, the term of this patent is extended or adjusted under 35 U.S.C. 154(b) by 346 days.

(21) Appl. No.: 12/474,245

(22) Filed: May 28, 2009

(65) Prior Publication Data

US 2009/0296193 A1  Dec. 3, 2009

Related U.S. Application Data

(60) Provisional application No. 61/056,601, filed on May 28, 2008.

(51) Int. Cl.
*G02B 6/10* (2006.01)
*G02B 26/00* (2006.01)

(52) U.S. Cl. ........ 385/146; 385/901; 362/560; 362/623; 359/291

(58) Field of Classification Search ................. 385/146, 385/901; 359/291; 362/560, 610, 615, 623
See application file for complete search history.

(56) References Cited

U.S. PATENT DOCUMENTS

| | | | |
|---|---|---|---|
| 4,375,312 A | 3/1983 | Tangonan | |
| 4,378,567 A | 3/1983 | Mir | |
| 4,974,942 A | 12/1990 | Gross | |
| 5,050,946 A | 9/1991 | Hathaway | |
| 5,221,982 A | 6/1993 | Faris | |
| 5,226,099 A | 7/1993 | Mignardi et al. | |
| 5,339,179 A | 8/1994 | Rudisill | |
| 5,341,242 A | 8/1994 | Gilboa et al. | |

(Continued)

FOREIGN PATENT DOCUMENTS

CN  1381752  11/2002

(Continued)

OTHER PUBLICATIONS

International Search Report issued Oct. 20, 2009 in PCT Appl. No. PCT/US2009/045186.

(Continued)

*Primary Examiner* — Daniel Petkovsek

(74) *Attorney, Agent, or Firm* — Knobbe Martens Olson & Bear LLP

(57) ABSTRACT

A illumination device comprises a light guide having a first end for receiving light and configured to support propagation of light along the length of the light guide. A turning microstructure is disposed on a first side of the light guide configured to turn light incident on the first side and to direct the light out a second opposite side of the light guide, wherein the turning microstructure comprises a plurality of indentations. A cover is physically coupled to the light guide and disposed over the turning microstructure. An interlayer is between the cover and the light guide, wherein the interlayer physically couples the cover to the light guide. A plurality of open regions is between the interlayer and the plurality of indentations. Various embodiments include methods of coupling the cover to the light guide while preserving open regions between the cover and plurality of indentations.

32 Claims, 12 Drawing Sheets

U.S. PATENT DOCUMENTS

| | | | |
|---|---|---|---|
| 5,481,385 A | 1/1996 | Zimmerman et al. | |
| 5,555,160 A | 9/1996 | Tawara | |
| 5,592,332 A | 1/1997 | Nishio | |
| 5,647,036 A | 7/1997 | Deacon | |
| 5,671,994 A | 9/1997 | Tai | |
| 5,703,667 A | 12/1997 | Ochiai | |
| 5,712,694 A | 1/1998 | Taira et al. | |
| 5,771,321 A | 6/1998 | Stern | |
| 5,783,614 A | 7/1998 | Chen | |
| 5,892,598 A | 4/1999 | Asakawa et al. | |
| 5,914,760 A | 6/1999 | Daiku | |
| 6,040,937 A | 3/2000 | Miles | |
| 6,074,069 A | 6/2000 | Chao-Ching | |
| 6,091,469 A | 7/2000 | Naito | |
| 6,099,134 A | 8/2000 | Taniguchi | |
| 6,123,431 A | 9/2000 | Teragaki | |
| 6,195,196 B1 | 2/2001 | Kimura | |
| 6,259,854 B1 | 7/2001 | Shinji et al. | |
| 6,379,017 B2 | 4/2002 | Nakabayashi et al. | |
| 6,407,785 B1 | 6/2002 | Yamazaki | |
| 6,454,452 B1 | 9/2002 | Sasagawa | |
| 6,512,626 B1 | 1/2003 | Schmidt | |
| 6,522,794 B1 | 2/2003 | Bischel | |
| 6,582,095 B1 | 6/2003 | Toyoda | |
| 6,592,234 B2 | 7/2003 | Epstein | |
| 6,603,520 B2 | 8/2003 | Umemoto | |
| 6,631,998 B2 | 10/2003 | Egawa et al. | |
| 6,636,358 B2 | 10/2003 | Umemoto et al. | |
| 6,642,913 B1 | 11/2003 | Kimura et al. | |
| 6,650,455 B2 | 11/2003 | Miles | |
| 6,652,109 B2 | 11/2003 | Nakamura | |
| 6,657,683 B2 | 12/2003 | Richard | |
| 6,667,782 B1 | 12/2003 | Taira et al. | |
| 6,669,350 B2 | 12/2003 | Yamashita | |
| 6,674,562 B1 | 1/2004 | Miles | |
| 6,685,342 B2 | 2/2004 | Terada | |
| 6,693,690 B2 | 2/2004 | Umemoto | |
| 6,709,123 B2 | 3/2004 | Flohr | |
| 6,742,921 B2 | 6/2004 | Umemoto | |
| 6,747,801 B2 * | 6/2004 | Umemoto et al. | 359/599 |
| 6,751,023 B2 | 6/2004 | Ariyoshi et al. | |
| 6,761,461 B2 | 7/2004 | Mizutani et al. | |
| 6,773,126 B1 | 8/2004 | Hatjasalo | |
| 6,778,746 B2 | 8/2004 | Charlton | |
| 6,798,469 B2 | 9/2004 | Kimura | |
| 6,819,380 B2 | 11/2004 | Wen et al. | |
| 6,852,396 B1 | 2/2005 | Mineo | |
| 6,862,141 B2 | 3/2005 | Olczak | |
| 6,865,312 B2 | 3/2005 | Niv et al. | |
| 6,879,354 B1 | 4/2005 | Sawayama | |
| 6,883,924 B2 | 4/2005 | Maeda et al. | |
| 6,891,530 B2 * | 5/2005 | Umemoto et al. | 345/173 |
| 6,930,816 B2 | 8/2005 | Mochizuki | |
| 6,964,484 B2 | 11/2005 | Gupta | |
| 6,966,685 B2 | 11/2005 | Li et al. | |
| 7,010,212 B2 * | 3/2006 | Emmons et al. | 385/146 |
| 7,042,643 B2 | 5/2006 | Miles | |
| 7,072,096 B2 | 7/2006 | Holman et al. | |
| 7,110,158 B2 | 9/2006 | Miles | |
| 7,123,216 B1 | 10/2006 | Miles | |
| 7,133,022 B2 | 11/2006 | Grabert | |
| 7,142,347 B2 | 11/2006 | Islam | |
| 7,156,546 B2 | 1/2007 | Higashiyama | |
| 7,186,014 B2 | 3/2007 | Shimura | |
| 7,218,812 B2 | 5/2007 | Maxwell | |
| 7,262,754 B1 | 8/2007 | Yamazaki | |
| 7,278,774 B2 | 10/2007 | Chang | |
| 7,327,510 B2 | 2/2008 | Cummings et al. | |
| 7,352,501 B2 | 4/2008 | Chopra et al. | |
| 7,355,780 B2 | 4/2008 | Chui | |
| 7,359,011 B2 | 4/2008 | Hamada | |
| 7,360,939 B2 | 4/2008 | Sugiura | |
| 7,366,393 B2 | 4/2008 | Cassarly | |
| 7,380,969 B2 | 6/2008 | Yamashita | |
| 7,417,784 B2 | 8/2008 | Sasagawa | |
| 7,450,295 B2 | 11/2008 | Tung | |
| 7,452,120 B2 | 11/2008 | Lee et al. | |
| 7,515,336 B2 | 4/2009 | Lippey | |
| 7,532,800 B2 | 5/2009 | Iimura | |
| 7,543,974 B2 * | 6/2009 | Bourdelais et al. | 362/627 |
| 7,706,050 B2 | 4/2010 | Sampsell | |
| 7,722,790 B2 * | 5/2010 | Krishnan et al. | 264/219 |
| 7,733,439 B2 | 6/2010 | Sampsell | |
| 7,750,886 B2 | 7/2010 | Sampsell | |
| 7,766,531 B2 * | 8/2010 | Anderson et al. | 362/615 |
| 7,777,954 B2 | 8/2010 | Gruhlke | |
| 7,855,827 B2 | 12/2010 | Xu et al. | |
| 2001/0019479 A1 | 9/2001 | Nakabayashi | |
| 2002/0051354 A1 | 5/2002 | Egawa | |
| 2002/0106182 A1 | 8/2002 | Kawashima | |
| 2002/0154256 A1 | 10/2002 | Gotoh | |
| 2003/0030764 A1 | 2/2003 | Lee | |
| 2003/0034445 A1 | 2/2003 | Boyd et al. | |
| 2003/0071947 A1 | 4/2003 | Shiraogawa | |
| 2003/0083429 A1 | 5/2003 | Smith | |
| 2003/0086030 A1 | 5/2003 | Taniguchi et al. | |
| 2003/0086031 A1 | 5/2003 | Taniguchi | |
| 2003/0090887 A1 | 5/2003 | Igarashi | |
| 2003/0095401 A1 | 5/2003 | Hanson | |
| 2003/0099118 A1 | 5/2003 | Saitoh | |
| 2003/0103344 A1 | 6/2003 | Niida | |
| 2003/0123245 A1 | 7/2003 | Parker | |
| 2003/0160919 A1 | 8/2003 | Suzuki | |
| 2003/0165067 A1 | 9/2003 | Imamura | |
| 2003/0169385 A1 | 9/2003 | Okuwaki | |
| 2003/0184989 A1 * | 10/2003 | Matsumoto et al. | 362/19 |
| 2003/0193630 A1 | 10/2003 | Chiou | |
| 2003/0210222 A1 | 11/2003 | Ogiwara | |
| 2003/0210367 A1 | 11/2003 | Nakano | |
| 2003/0214728 A1 | 11/2003 | Olczak | |
| 2004/0001169 A1 | 1/2004 | Saiki | |
| 2004/0017599 A1 | 1/2004 | Yang | |
| 2004/0027315 A1 | 2/2004 | Senda et al. | |
| 2004/0070711 A1 | 4/2004 | Wen | |
| 2004/0080938 A1 | 4/2004 | Holman | |
| 2004/0109305 A1 | 6/2004 | Chisholm | |
| 2004/0135494 A1 | 7/2004 | Miyatake | |
| 2004/0188599 A1 | 9/2004 | Viktorovitch | |
| 2004/0228109 A1 | 11/2004 | Leu | |
| 2004/0228112 A1 | 11/2004 | Takata | |
| 2005/0002175 A1 | 1/2005 | Matsui et al. | |
| 2005/0018103 A1 | 1/2005 | Lubart et al. | |
| 2005/0024849 A1 | 2/2005 | Parker | |
| 2005/0024890 A1 | 2/2005 | Yamamoto | |
| 2005/0041175 A1 | 2/2005 | Akiyama | |
| 2005/0046011 A1 | 3/2005 | Chen | |
| 2005/0069254 A1 | 3/2005 | Schultheis | |
| 2005/0146897 A1 | 7/2005 | Mimura | |
| 2005/0185416 A1 | 8/2005 | Lee et al. | |
| 2005/0231981 A1 | 10/2005 | Hoelen et al. | |
| 2005/0270798 A1 | 12/2005 | Lee et al. | |
| 2005/0271325 A1 | 12/2005 | Anderson | |
| 2006/0002141 A1 | 1/2006 | Ouderkirk | |
| 2006/0002675 A1 | 1/2006 | Choi et al. | |
| 2006/0061705 A1 | 3/2006 | Onishi | |
| 2006/0066586 A1 | 3/2006 | Gally | |
| 2006/0066935 A1 | 3/2006 | Cummings | |
| 2006/0077123 A1 | 4/2006 | Gally | |
| 2006/0110090 A1 | 5/2006 | Ellwood | |
| 2006/0132383 A1 | 6/2006 | Gally | |
| 2006/0164861 A1 | 7/2006 | Maeda | |
| 2006/0187676 A1 | 8/2006 | Ishikura | |
| 2006/0209012 A1 | 9/2006 | Hagood, IV | |
| 2006/0209385 A1 | 9/2006 | Liu | |
| 2006/0215958 A1 | 9/2006 | Yeo | |
| 2006/0268574 A1 | 11/2006 | Jung | |
| 2007/0097694 A1 | 5/2007 | Faase | |
| 2007/0133226 A1 | 6/2007 | Mi | |
| 2007/0147087 A1 | 6/2007 | Parker | |
| 2007/0187852 A1 | 8/2007 | Parker et al. | |
| 2007/0189036 A1 | 8/2007 | Chen | |
| 2007/0201234 A1 | 8/2007 | Ottermann | |
| 2007/0279727 A1 | 12/2007 | Gandhi | |
| 2007/0292091 A1 | 12/2007 | Fujii | |
| 2008/0089092 A1 | 4/2008 | Lee et al. | |
| 2008/0090025 A1 | 4/2008 | Freking | |
| 2008/0094853 A1 | 4/2008 | Kim | |

| | | | |
|---|---|---|---|
| 2008/0100900 A1 | 5/2008 | Chui | |
| 2008/0170414 A1 | 7/2008 | Wang | |
| 2008/0232135 A1 | 9/2008 | Kinder | |
| 2008/0285307 A1 | 11/2008 | Aylward | |
| 2009/0015753 A1 | 1/2009 | Ye | |
| 2009/0097100 A1 | 4/2009 | Gally | |
| 2009/0126792 A1 | 5/2009 | Gruhlke | |
| 2009/0135469 A1 | 5/2009 | Lee et al. | |
| 2009/0147332 A1 | 6/2009 | Bita et al. | |
| 2009/0147535 A1 | 6/2009 | Mienko | |
| 2009/0168459 A1 | 7/2009 | Holman | |
| 2009/0201571 A1 | 8/2009 | Gally | |
| 2010/0026727 A1 | 2/2010 | Bita et al. | |
| 2010/0039832 A1 | 2/2010 | Ahlgren et al. | |
| 2010/0051089 A1 | 3/2010 | Khazeni | |
| 2010/0053148 A1 | 3/2010 | Khazeni | |
| 2010/0141557 A1 | 6/2010 | Gruhlke | |
| 2010/0177533 A1 | 7/2010 | Griffiths | |
| 2010/0231510 A1 | 9/2010 | Sampsell | |
| 2010/0309687 A1 | 12/2010 | Sampsell | |

FOREIGN PATENT DOCUMENTS

| | | |
|---|---|---|
| CN | 1643439 A | 7/2005 |
| EP | 0 278 038 | 8/1988 |
| EP | 0539099 | 4/1993 |
| EP | 0 590 511 | 4/1994 |
| EP | 0621500 | 10/1994 |
| EP | 0 879 991 | 11/1998 |
| EP | 0 957 392 | 11/1999 |
| EP | 0 984 314 | 3/2000 |
| EP | 1116987 | 7/2001 |
| EP | 1 122 586 | 8/2001 |
| EP | 1 143 270 | 10/2001 |
| EP | 1 251 454 | 10/2002 |
| EP | 1251454 | 10/2002 |
| EP | 1 271 223 | 1/2003 |
| EP | 1 296 094 | 3/2003 |
| EP | 1 329 664 | 7/2003 |
| EP | 1 336 876 | 8/2003 |
| EP | 1 347 315 | 9/2003 |
| EP | 1 389 775 | 2/2004 |
| EP | 1 413 543 | 4/2004 |
| EP | 1437610 | 7/2004 |
| EP | 1 519 218 | 3/2005 |
| EP | 1 577 701 | 9/2005 |
| EP | 1 748 305 | 1/2007 |
| EP | 1 762 778 A | 3/2007 |
| EP | 1 975 651 | 10/2008 |
| EP | 1 988 332 | 11/2008 |
| EP | 1 988 333 | 11/2008 |
| GB | 2 315 356 | 1/1998 |
| GB | 2 331 615 | 5/1999 |
| GB | 2 351 834 | 1/2001 |
| JP | 09 171111 | 6/1997 |
| JP | 11 160699 | 6/1999 |
| JP | 11 211999 | 8/1999 |
| JP | 2000 075293 | 3/2000 |
| JP | 2000 081848 | 3/2000 |
| JP | 2000 181367 | 6/2000 |
| JP | 2000 193933 | 7/2000 |
| JP | 2001-021883 | 1/2001 |
| JP | 2002-108227 | 4/2002 |
| JP | 2002 174732 | 6/2002 |
| JP | 2002 174780 | 6/2002 |
| JP | 2002 196152 | 7/2002 |
| JP | 2002 245835 | 8/2002 |
| JP | 2003 007114 | 1/2003 |
| JP | 2003 057653 | 2/2003 |
| JP | 2003 173713 | 6/2003 |
| JP | 2003 186008 | 7/2003 |
| JP | 2003 188959 | 7/2003 |
| JP | 2003-315694 | 11/2003 |
| JP | 2003 344881 | 12/2003 |
| JP | 2004-534280 A | 11/2004 |
| JP | 2005-259365 | 9/2005 |
| JP | 2006 107993 | 4/2006 |
| JP | 2008 103110 | 5/2008 |
| TW | 567388 | 12/2003 |
| WO | WO 94/06871 A1 | 3/1994 |
| WO | WO 95/01584 | 1/1995 |
| WO | WO 98/19201 | 5/1998 |
| WO | WO 99/63394 | 12/1999 |
| WO | WO 99/64785 A | 12/1999 |
| WO | WO 00/50807 | 8/2000 |
| WO | WO 01/29148 | 4/2001 |
| WO | WO 01/57434 | 8/2001 |
| WO | WO 01/84228 | 11/2001 |
| WO | WO 01/84229 | 11/2001 |
| WO | WO 02/071132 | 9/2002 |
| WO | WO 03/007049 | 1/2003 |
| WO | WO 03/056876 | 7/2003 |
| WO | WO 2004/015489 | 2/2004 |
| WO | WO 2004/088372 | 10/2004 |
| WO | WO 2004/114418 A1 | 12/2004 |
| WO | WO 2005/011012 | 2/2005 |
| WO | WO 2005/111669 | 11/2005 |
| WO | WO 2007/064133 | 6/2007 |
| WO | WO 2007/094558 | 8/2007 |
| WO | WO 2008/038754 | 4/2008 |
| WO | WO 2008/045200 | 4/2008 |
| WO | WO 2008/045207 | 4/2008 |
| WO | WO 2008/045218 | 4/2008 |
| WO | WO 2008/045224 | 4/2008 |
| WO | WO 2008/137299 | 11/2008 |
| WO | WO 2009/011922 A1 | 1/2009 |
| WO | WO 2009/154957 | 12/2009 |

OTHER PUBLICATIONS

International Search Report issued Jan. 29, 2010 in PCT Appl. No. PCT/US2009/045186.
International Preliminary Report on Patentability, mailed on Sep. 24, 2010, PCT Appl. No. PCT/US2009/045186 filed May 26, 2009, 21 pages.
Material: PDMS (polydimethylsiloxane), Webpage, http://www.mit.edu/~6.777/matprops/pdms.htm, Printed Dec. 9, 2010, available Jan. 2005, 2 pages.
Solid surface energy data (SFE) for common polymers, Webpage, http://www.surface-tension.de/solid-surface-energy.htm, Printed Dec. 9, 2010, updated Nov. 20, 2007, 2 pages.
Surface Energy and Wetting, Webpage, http://www.adhesives.org/StructuralDesign/SurfaceEnergyandWetting.aspx, Printed Dec. 9, 2010, 2 pages.
Official Communication in Chinese Application No. 200880014256.0, dated May 24, 2011.
Official Communication in Chinese Application No. 200880014256.0, dated Nov. 17, 2011.
Official Communication in European Application No. 08 153 436.4, dated Feb. 18, 2011.
Official Communication in European Application No. 08 153 770.6, dated Feb. 18, 2011.
Anonymously, (May 15, 2006). "Spreaders in light-guide optics", IP.com No. IPCOM000013631,4.
Di Feng, et al. "Novel integrated light-guide plates for liquid crystal display backlight", Journal of optics A: Pure and Applied optics, 7 (2005) 111-117.
Fan et al., "Channel Drop Filters in Photonic Crystals", Optics Express, vol. 3, No. 1, pp. 4-11, 1998.
Giles et al., "Silicon MEMS Optical Switch Attenuator and Its Use in Lightwave Subsystems", IEEE Journal of Selected Topics in Quantum Electronics, vol. 5. No. 1, pp. 18-25, Jan./Feb. 1999.
Little et al., "Vertically Coupled Microring Rosonator Channel Dropping Filter", IEEE Photonics Technology Letters, vol. 11, No. 2, pp. 215-217, 1999.
Magel, "Integrated Optic Devices Using Micromachined Metal Membranes", SPIE vol. 2686, 0-8194-2060-3, pp. 54-63, 1996.
Mehregany, et. al., "MEMS applications in Optical Systems," IEEE/LEOS 1996 Summer Topical Meetings, pp. 75-76, Aug. 1996.
Oliner, "Radiating Elements and Mutual Coupling," Microwave Scanning Antennas, vol. 2, pp. 131-157 and pp. 190-194, 1966.
Yan, et al., "Edge-Lighting Light Guide Plate Based on Micro-Prism for Liquid Crystal Display," Journal of Display Technology, vol. 5, No. 9, pp. 355-357, Sep. 2009.

Yu, et al., "Design Optimization and Stamper Fabrication of Light Guiding Plates Using Silicon Based Micro-Features," IEEE Symposium on DTIP of MEMS/MOEMS, Rome, Apr. 1-3, 2009.

Zhou et al., "Waveguide Panel Display Using Electromechanical Spatial Modulators" SID Digest, vol. XXIX, 1998.

International Preliminary Report on Patentability in PCT/US2009/045186 dated Sep. 24, 2010.

Extended European Search Report in App. No. 08153436.4 (Publication No. EP 1988332) dated Oct. 1, 2008.

Extended European Search Report in App. No. 08153770.6 (Publication No. EP 1988333) dated Sep. 29, 2008.

International Preliminary Report on Patentability in PCT/US2008/061046 (International Publication No. WO 2008/137299) dated Jul. 15, 2009.

International Search Report and Written Opinion in PCT/US2008/061046 (International Publication No. WO 2008/137299) dated Oct. 1, 2008.

Restriction Requirement in U.S. Appl. No. 11/742,299 dated Dec. 7, 2007.

Response to Restriction Requirement in U.S. Appl. No. 11/742,299, filed Jan. 7, 2008.

Office Action in U.S. Appl. No. 11/742,299, dated Apr. 14, 2008.

Response to Office Action in U.S. Appl. No. 11/742,299, filed Jul. 14, 2008.

Final Office Action in U.S. Appl. No. 11/742,299, dated Oct. 20, 2008.

Request for Continued Examination and Response to Final Office Action in U.S. Appl. No. 11/742,299, filed Mar. 20, 2009.

Notice of Allowance in U.S. Appl. No. 11/742,299, dated Jun. 5, 2009.

Request for Continued Examination and Information Disclosure Statement in U.S. Appl. No. 11/742,299, filed Sep. 2, 2009.

Notice of Allowance in U.S. Appl. No. 11/742,299, dated Dec. 16, 2009.

Amendment and Reasons for Allowance in U.S. Appl. No. 11/742,299, filed Mar. 15, 2010.

Preliminary Amendment in U.S. Appl. No. 12/795,542, filed Aug. 18, 2010.

Preliminary Amendment in U.S. Appl. No. 12/795,542, filed Sep. 15, 2010.

Official Communication in Chinese Application No. 200980119525.4 dated Apr. 23, 2012.

Official Communication in Japanese Application No. 2011-511757 dated Sep. 11, 2012.

* cited by examiner

|  | Column Output Signals | |
|---|---|---|
|  | +$V_{bias}$ | -$V_{bias}$ |
| Row Output Signals   0 | Stable | Stable |
| +ΔV | Relax | Actuate |
| −ΔV | Actuate | Relax |

FRONT LIGHT DEVICES AND METHODS OF FABRICATION THEREOF

REFERENCE TO RELATED APPLICATIONS

The present application claims priority to U.S. Provisional Application No. 61/056,601, filed May 28, 2008, the disclosure of which is hereby incorporated by reference herein in its entirety.

BACKGROUND

1. Field of the Invention

The present invention relates to microelectromechanical systems (MEMS).

2. Description of the Related Art

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

In one embodiment, an illumination device comprises a light guide having a first end for receiving light and configured to support propagation of light along the length of the light guide. A turning microstructure is disposed on a first side of the light guide configured to turn light incident on the first side and to direct the light out a second opposite side of the light guide, wherein the turning microstructure comprises a plurality of indentations. A cover is physically coupled to the light guide and disposed over the turning microstructure. An interlayer is between the cover and the light guide, wherein the interlayer physically couples the cover to the light guide. A plurality of open regions is between the interlayer and the plurality of indentations, wherein the light guide has a first index of refraction and the interlayer has a second index of refraction and the second index of refraction is lower than the first index of refraction.

In another embodiment, an illumination device comprises a light guide having a first end for receiving light and configured to support propagation of light along the length of the light guide. A turning microstructure is disposed on a first side of the light guide configured to turn light incident on the first side and to direct the light out a second opposite side of the light guide, wherein the turning microstructure comprises a plurality of indentations. A cover is physically coupled to the light guide and disposed over the turning microstructure. An interlayer is between the cover and the light guide, wherein the interlayer physically couples the cover to the light guide. A plurality of regions is between the interlayer and the plurality of indentations at least partially comprising a material different from the interlayer.

In another embodiment, an illumination device comprises a light guide having a first end for receiving light and configured to support propagation of light along the length of the light guide. A turning microstructure is disposed on a first side of the light guide configured to turn light incident on the first side and to direct the light out a second opposite side of the light guide, wherein the turning microstructure comprises a plurality of indentations. A cover is physically coupled to the light guide and disposed over the turning microstructure. A plurality of open regions is between the cover and the plurality of indentations, wherein the light guide has a first index of refraction and the cover has a second index of refraction and the second index of refraction is lower than the first index of refraction.

In another embodiment, a method of manufacturing a illumination device comprises providing a light guide having a first end for receiving light and configured to support propagation of light along the length of the light guide, said light guide having turning microstructure disposed on a first side thereof that is configured to turn light incident on the first side and to direct the light out a second opposite side of the light guide, wherein the turning microstructure comprises a plurality of indentations. The method also comprises providing a cover disposed over the turning microstructure. The method also comprises physically coupling the cover to the light guide by an interlayer such that a plurality of open regions are between the interlayer and the plurality of indentations, wherein the light guide has a first index of refraction and the interlayer has a second index of refraction and the second index of refraction is lower than the first index of refraction.

In another embodiment, a method of manufacturing a illumination device comprises providing a light guide having a first end for receiving light and configured to support propagation of light along the length of the light guide, said light guide having turning microstructure disposed on a first side thereof that is configured to turn light incident on the first side and to direct the light out a second opposite side of the light guide, wherein the turning microstructure comprises a plurality of indentations. The method also comprises providing a cover disposed over the turning microstructure. The method also comprises physically coupling the cover to the light guide by an interlayer such that a plurality of regions between the interlayer and the plurality of indentations at least partially comprises a material different from the interlayer.

In another embodiment, a method of manufacturing a illumination device comprises providing a light guide having a first end for receiving light and configured to support propagation of light along the length of the light guide, said light guide having turning microstructure disposed on a first side thereof that is configured to turn light incident on the first side and to direct the light out a second opposite side of the light guide, wherein the turning microstructure comprises a plurality of indentations. The method also comprises physically coupling a cover to the light guide, wherein the cover is disposed over the turning microstructure, and wherein the light guide has a first index of refraction and the cover has a second index of refraction and the second index of refraction is lower than the first index of refraction.

In another embodiment, an illumination device comprises a means for turning light having a first end for receiving light and configured to support propagation of light along the length of the light guiding means. A means for turning light is disposed on a first side of the light guiding means configured to turn light incident on the first side and to direct the light out a second opposite side of the light guiding means, wherein the turning means comprises a plurality of means for reflecting light. A means for covering is physically coupled to the light guiding means and disposed over the turning means. The device comprises a means for physically coupling the covering means to the light guiding means. A plurality of open regions are between the covering means and the plurality of reflecting means, wherein the light guiding means has a first index of refraction and the coupling means has a second index of refraction and the second index of refraction is lower than the first index of refraction.

In another embodiment, an illumination device comprises a means for turning light having a first end for receiving light and configured to support propagation of light along the length of the light guiding means. A means for turning light is disposed on a first side of the light guiding means configured to turn light incident on the first side and to direct the light out a second opposite side of the light guiding means, wherein the turning means comprises a plurality of means for reflecting light. A means for covering is physically coupled to the light guiding means and disposed over the turning means. The device comprises a means for physically coupling the covering means to the light guiding means. A plurality of regions are between the covering means and the plurality of reflecting means at least partially comprising a material different from the coupling means.

In another embodiment, an illumination device comprises a means for turning light having a first end for receiving light and configured to support propagation of light along the length of the light guiding means. A means for turning light is disposed on a first side of the light guiding means configured to turn light incident on the first side and to direct the light out a second opposite side of the light guiding means, wherein the turning means comprises a plurality of means for reflecting light. A means for covering is physically coupled to the light guiding means and disposed over the turning means. A plurality of open regions are between the covering means and the plurality of reflecting means, wherein the light guiding means has a first index of refraction and the covering means has a second index of refraction and the second index of refraction is lower than the first index of refraction.

DETAILED DESCRIPTION OF THE CERTAIN PREFERRED EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Certain embodiments included herein comprise illumination apparatus for displays. An illumination device may comprise a light guide having a first end for receiving light and configured to support propagation of light along the length of the light guide. A turning microstructure is disposed on a first side of the light guide configured to turn light incident on the first side and to direct the light out a second opposite side of the light guide, wherein the turning microstructure comprises a plurality of indentations. A cover is physically coupled to the light guide and disposed over the turning microstructure. A plurality of open regions is between the cover and the plurality of indentations. Various embodiments include methods of bonding the cover to the light guide while not filling the open regions between the cover and plurality of indentations (e.g., with adhesive).

Figure 1:
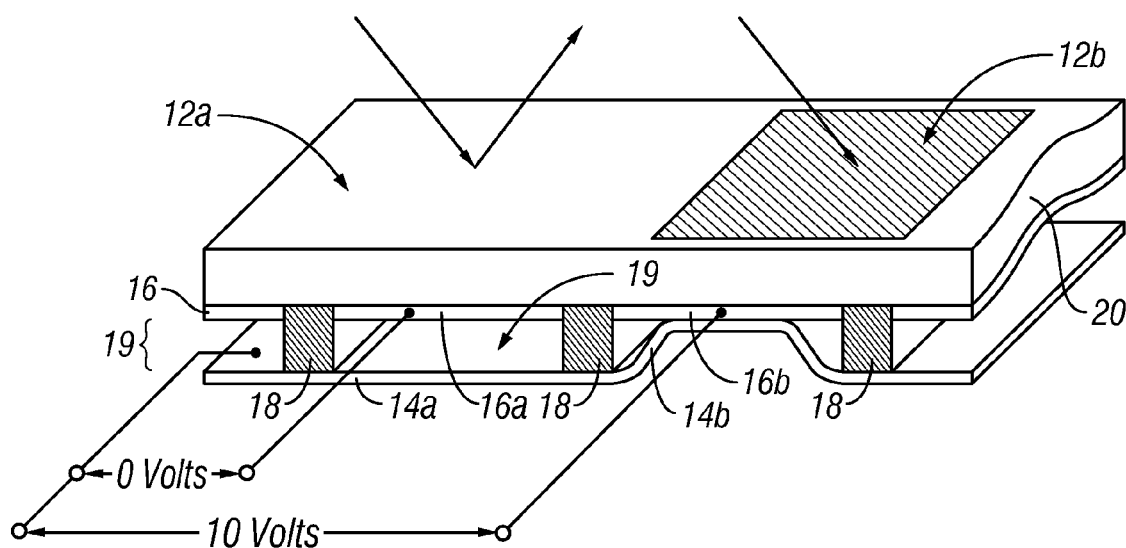
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
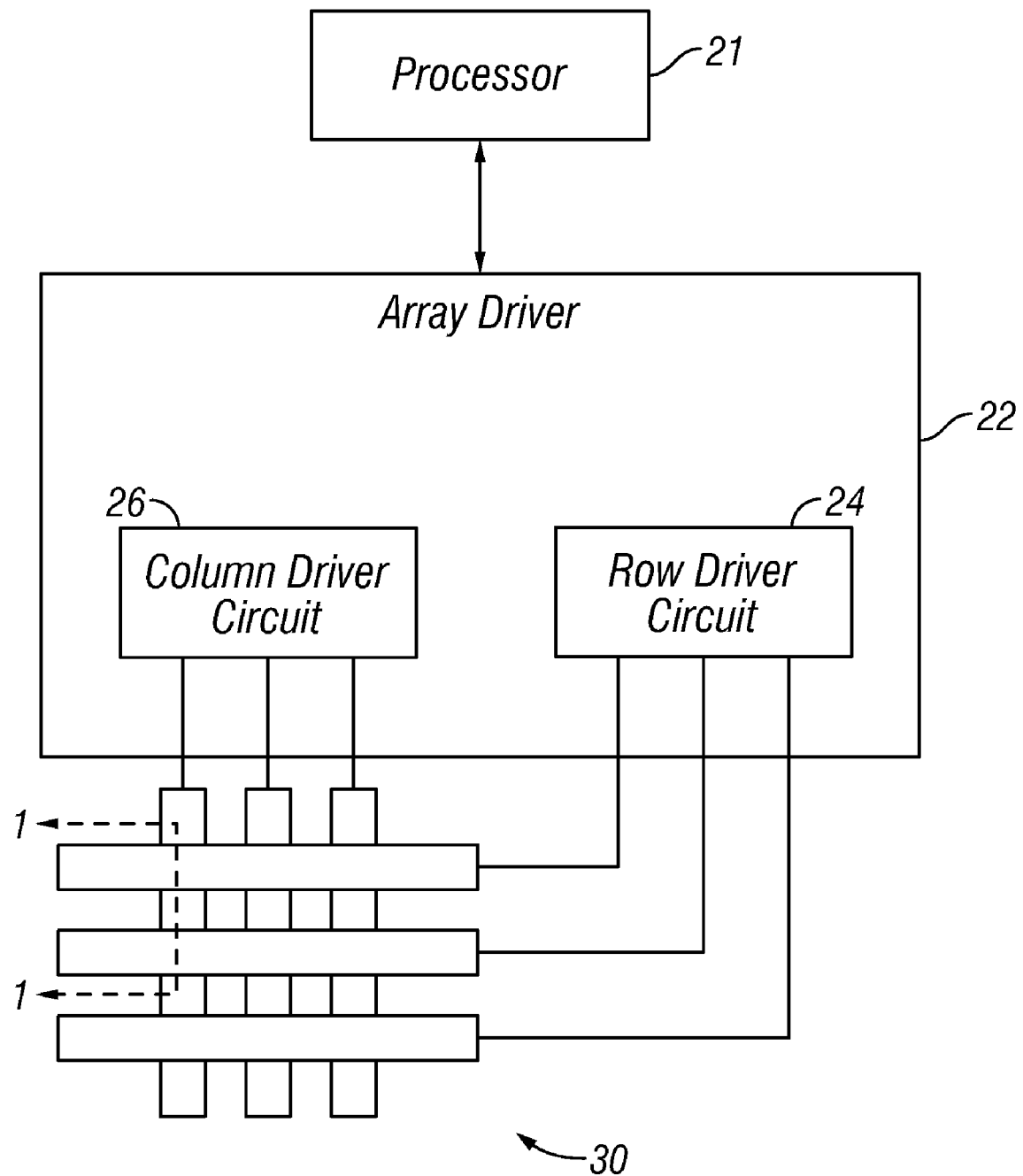
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
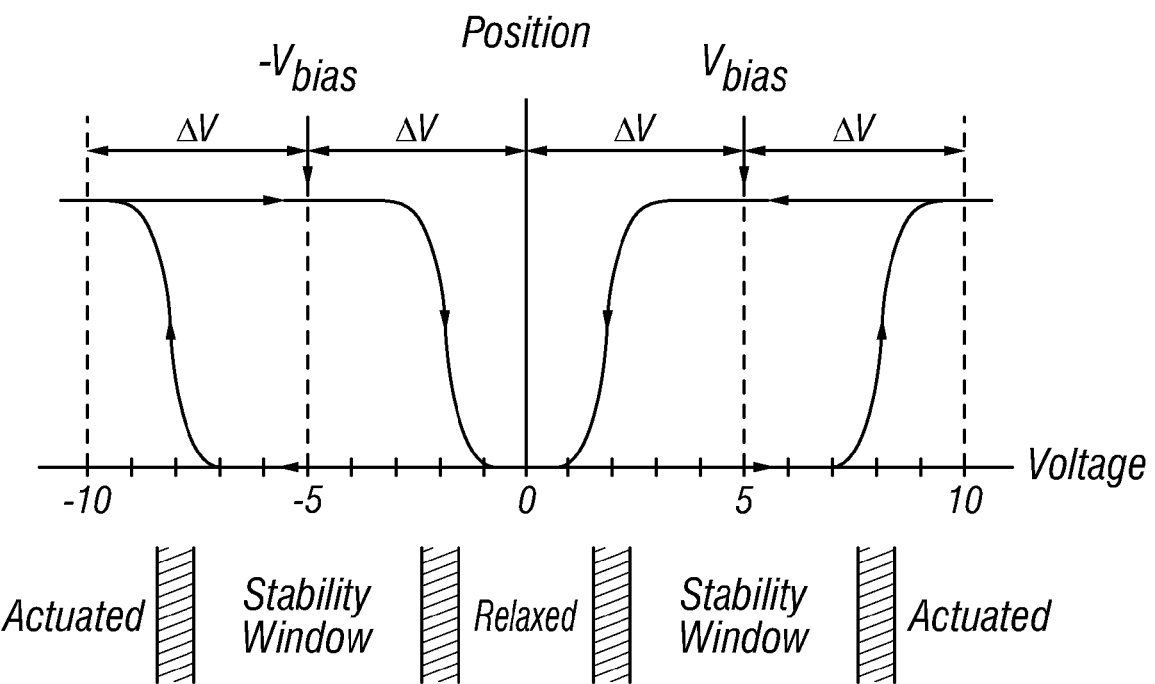
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
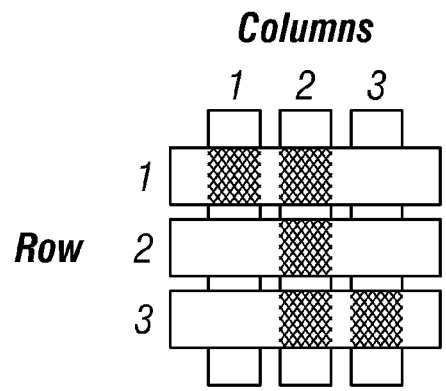
FIG. 5A illustrates one exemplary frame of display data in the 3×3 interferometric modulator display of FIG. 2.
Figure 5B:
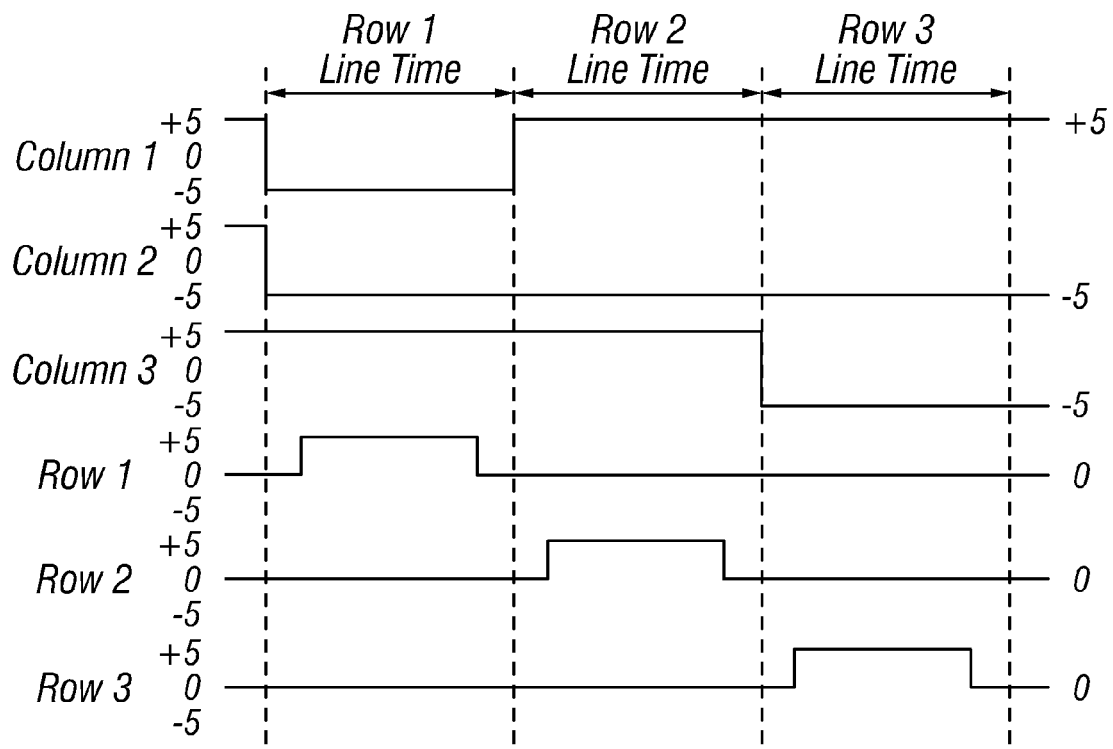
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts, respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
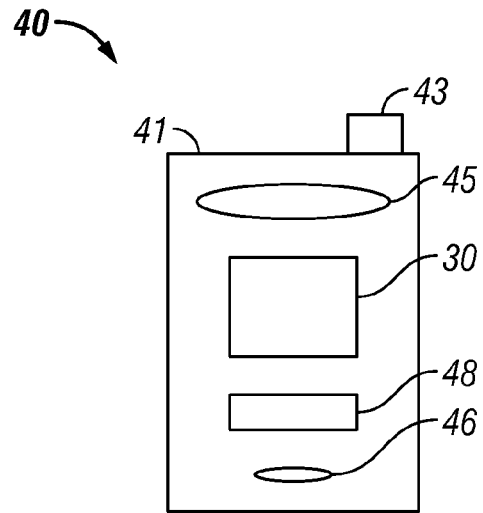
FIGS. 6A and 6B are system block diagrams illustrating an embodiment of a visual display device comprising a plurality of interferometric modulators.
Figure 6B:
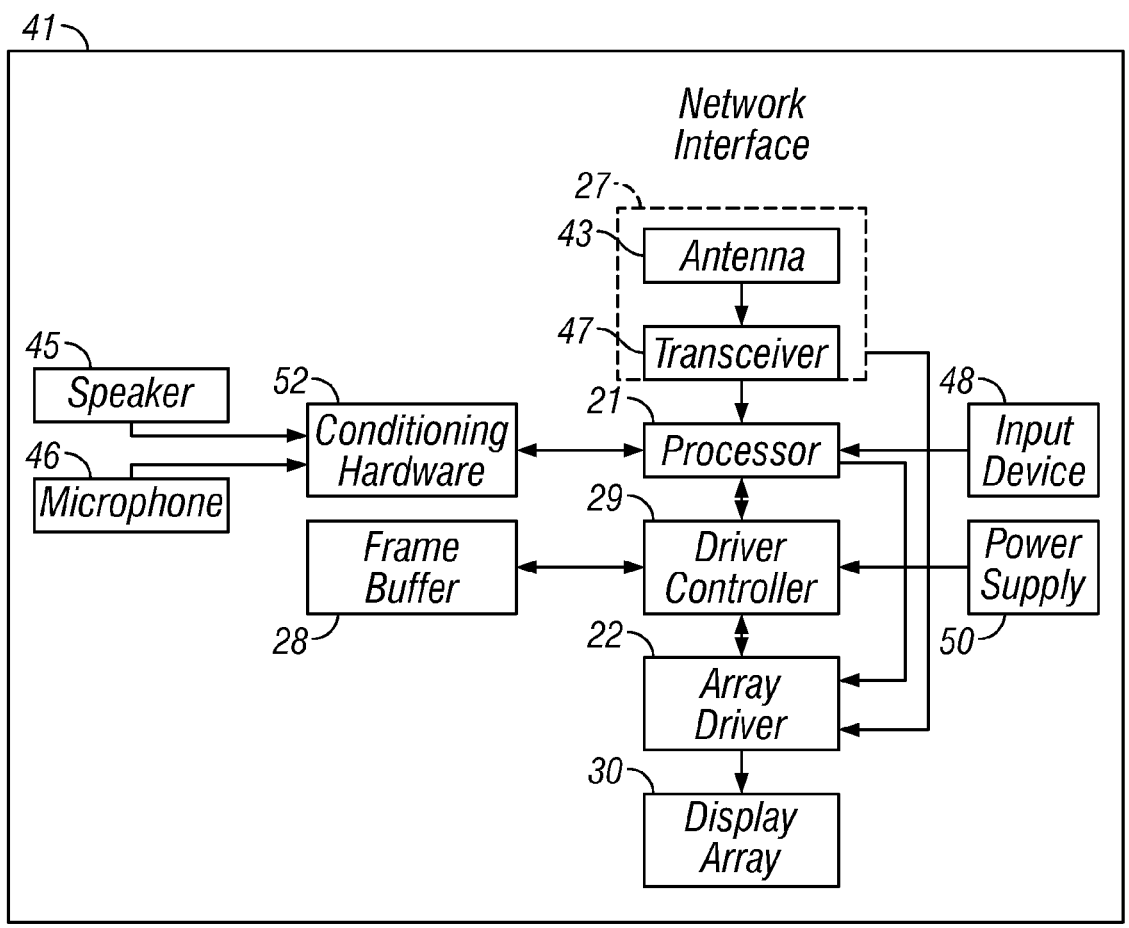

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
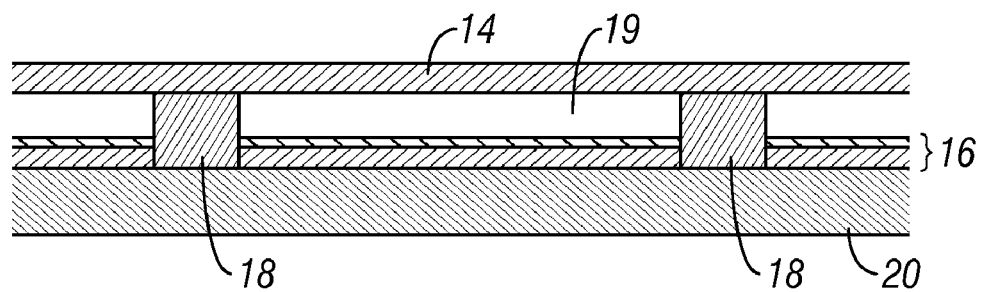
FIG. 7A is a cross section of the device of FIG. 1.
Figure 7B:
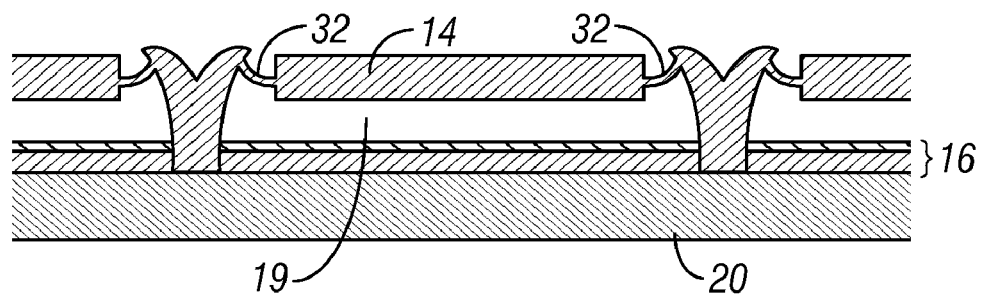
FIG. 7B is a cross section of an alternative embodiment of an interferometric modulator.
Figure 7C:
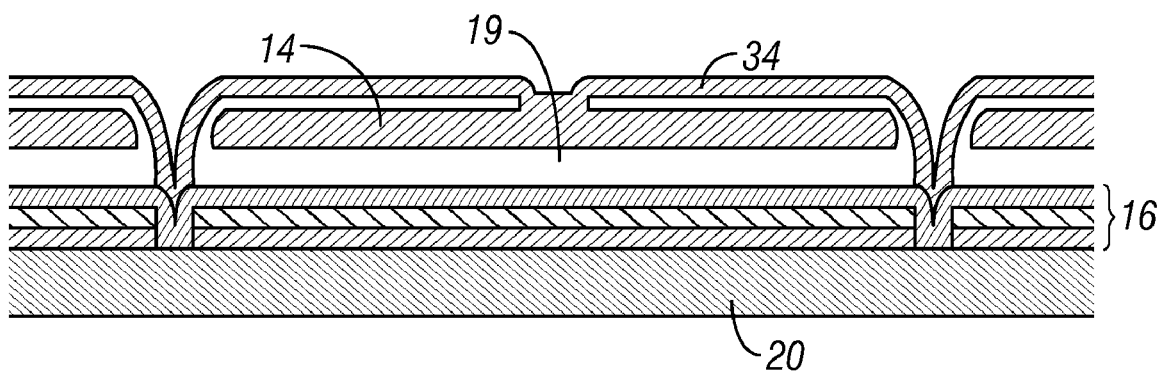
FIG. 7C is a cross section of another alternative embodiment of an interferometric modulator.
Figure 7D:
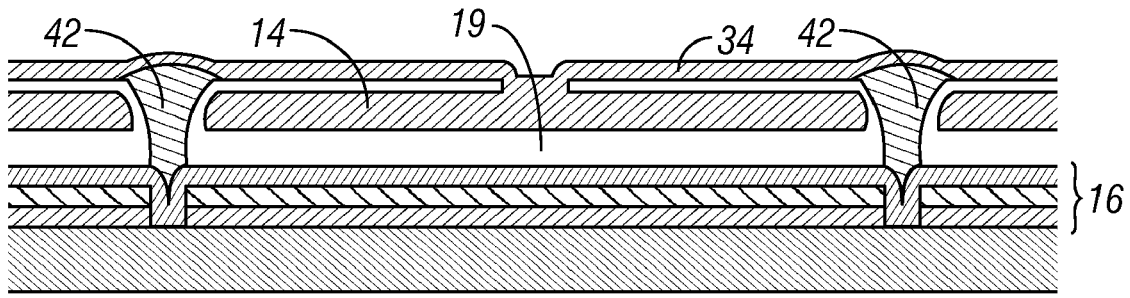
FIG. 7D is a cross section of yet another alternative embodiment of an interferometric modulator.
Figure 7E:
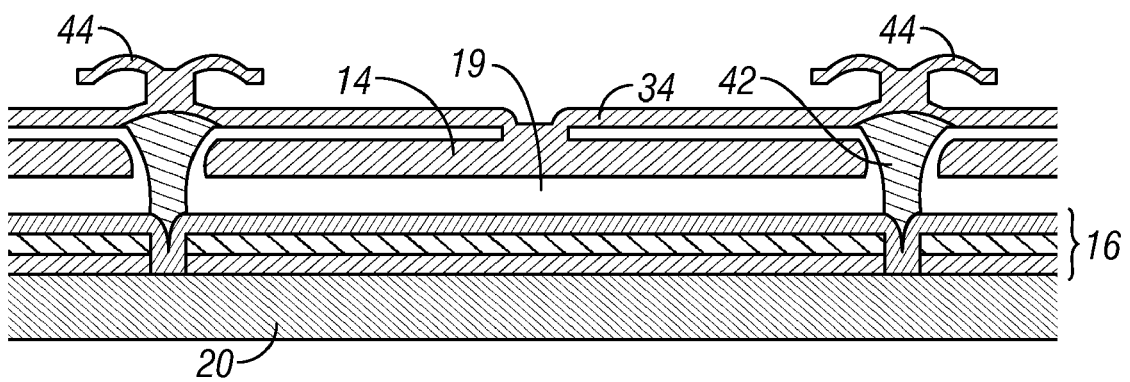
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the movable reflective layer 14 is attached to supports at the corners only, on tethers 32. In FIG. 7C, the movable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

As described above, light incident on an interferometric modulator is either reflected or absorbed via constructive or destructive interference according to an actuation state of one of the reflective surfaces. An illumination apparatus may provide artificial lighting to a display device comprising an interferometric modulator or array thereof.

In some embodiments, an illumination system comprises a light source, a light injection system, and a light guide panel that includes a light "turning" film. The light injection system transforms light from a point source (e.g., a light emitting diode (LED)) into a line source. A light bar having turning features may be used for this purpose. Light injected into the light bar propagates along the length of the bar and is ejected out of the bar over the length of the bar. This light is then spread across a wide area and directed onto an array of display elements. A light guide panel also having turning features thereon may be used for this purpose. The light ejected from the light bar is coupled into an edge of the light guide panel and propagated within the light guide panel. Turning features eject the light from the panel over an area corresponding the plurality of display elements.

Figure 8A:
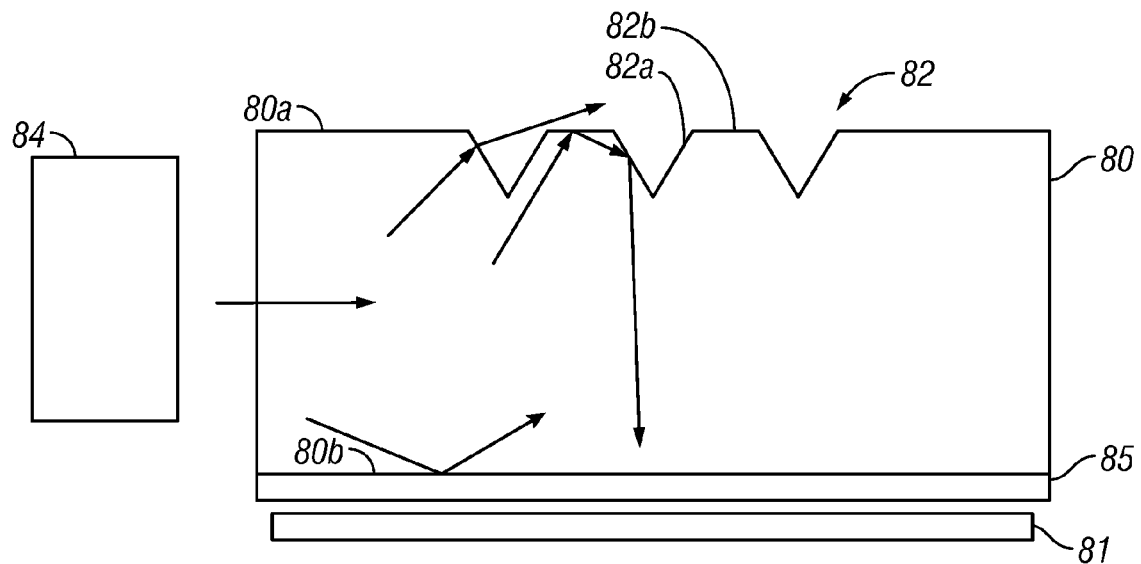
FIG. 8A is a cross section of an embodiment of a display device comprising a prismatic turning microstructure, a light guide panel and a display panel.

FIG. 8A is a cross-sectional view of a display device comprising a light guide panel 80 disposed with respect to a display 81. Display 81 may comprise a plurality of display elements, such as interferometric modulators. The light guide 80 may include a turning microstructure 82 on a first side 80*a*, as shown in FIG. 8A. The turning microstructure 82 is configured to turn a portion of the light incident on the first side 80*a* of the light guide 80 and to direct that portion of light out of the light guide 80 (e.g., out of a second side 80*b*) into the plurality of display elements 81. According to some embodiments, some or all of the features of the turning microstructure 82 could be formed in a turning film that forms part of the light guide 80. This turning film may be disposed on a substrate that also forms part of the light guide 80. In these embodiments, the turning film would have the same index of refraction as the substrate. Alternatively, the light guide 80 may be formed by molding or etching the surface of a substrate directly with turning features.

The turning microstructure 82 of the light guide 80 comprises a plurality of turning features or indentations 82*a* having facets or sloping surfaces configured to direct light out the second side 80*b* of the light guide 80. In certain embodiments, the turning features may comprise a plurality of surface features or volume features. In some embodiments, the turning microstructure 82*a* comprises a diffractive optical element. The diffractive optical element may comprise volume or surface features extending across the length of the turning microstructure 82. In certain embodiments, the turning microstructure 82 comprises a hologram and the turning features comprise holographic features. The hologram may comprise holographic volume or surface features, extending across the length of the turning microstructure 82. The size, shape, and separation of the turning features may vary. A wide variety of other types of turning features, diffractive, holographic, prismatic, or otherwise are possible. Accordingly, different sizes, shapes, configuration, and arrangements may be employed.

The features 82*a* shown in FIG. 8A are schematic and exaggerated in size and spacing therebetween. Light may, for example, reflect by total internal reflection from a portion 82*b* of the light guide 80 parallel to the length of the light guide 80 to one of the sloping surfaces 82*a*. The sloping surfaces 82*a* turn light such that it is redirected towards the second side 80*b* of light guide 80 and towards the display 81 and such that the propagation direction of the turned light forms an angle smaller than 45 degrees from the normal to the surface of the display elements. Accordingly, after being turned by the turning features, the light 100 is redirected through the thickness of the light guide 80 in a direction substantially normal to the light guide 80 and the display 81, and is transmitted to the interferometric modulators possibly at normal incidence or substantially close thereto. At the interferometric modulators, the light may be modulated and reflected back through the light guiding portion 80 towards a viewer disposed in front of the display device to provide an image on the display device.

In the embodiment illustrated in FIG. 8A, the turning microstructure 82 comprises a plurality of grooves, specifically, a plurality of triangular grooves having substantially triangular cross-sections. The grooves illustrated in FIG. 8A have cross-sections with the shape of an isosceles triangle, although grooves with other angles and other shapes are also possible. Specific examples include grooves with a cross-section profile composed of more than 2 sides, such as symmetric or asymmetric trapezoidal shape. The orientation and shape of the sides 82*a* may, for example, affect the distribution of light exiting out side 80*b* of the light guide 80 and entering the display 81.

Figure 8B:
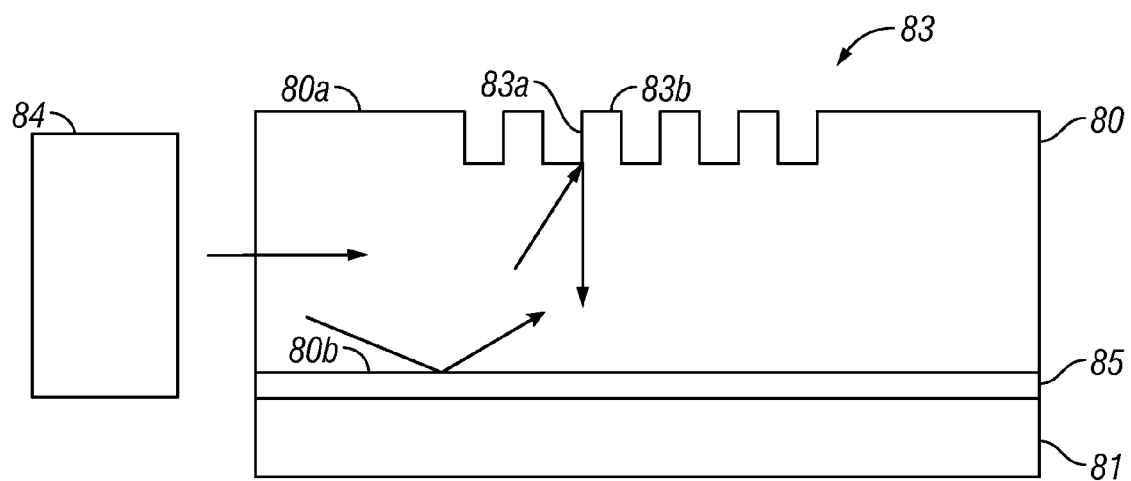
FIG. 8B is a cross section of a portion of another embodiment of a display device comprising a diffractive turning microstructure, a light guide panel and a display panel.

FIG. 8B illustrates another embodiment with a turning microstructure 83, wherein the turning features comprise diffractive features 83*a* rather than prismatic features (such as shown in FIG. 8A). In various preferred embodiments, the diffractive features 83a are configured to redirect light incident thereon at an angle through which light propagates within the light guide 80 out the second side 80b of the light guide 80 and into the display 81. Light may propagate along the length of the light guide 80, for example, via total internal reflection at grazing angles, e.g., of about 40° or more (as measured from the normal to sidewalls of the light guide 80). In some embodiments, this angle may be at or above the critical angle established by Snell's law. The diffracted ray 100 is redirected near normal to the length of the light guide 80. The diffractive features 83a may comprise surface or volume diffractive features. The diffractive features 83a may be included on a diffractive turning film on the first side 80a of the light guide 80. The diffractive features may comprise holographic features, and likewise, comprise a hologram or holographic film in some embodiments. Additionally, the diffractive features may extend continuously along the length of the light guide 80.

A light source 84 comprising, for example, one or more light emitting diodes (LEDs) is disposed with respect to the light guide 80 to inject light therein. In the embodiment shown in FIG. 8A, for example, the light from the light source 84 is injected into an edge of the light guide 80. In some embodiments, a light injection system transforms light from a point source emitter (e.g., a light emitting diode) into a line source. This light injection system may, for example, comprise a light bar. Other types of light sources may also be used.

The turning microstructure 82 and/or light guide region 80 typically comprises a material such as glass, polycarbonate, acrylic such as polymethymethacrylate (PMMA), acrylate copolymers such as poly(styrene-methylmethacrylate) polymers (PS-PMMA, sold under the name of Zylar), UV-curable resins, or other optically transparent materials. The index of refraction of polycarbonate is approximately 1.59 and for Zylar is approximately 1.54 for wavelengths in the visible spectrum. According to some embodiments, the light guide 80 may be a single layer, such as a plastic or glass, with facets formed on the top surface. The facets can be formed, for example, by embossing or etching directly onto the plastic or glass substrate. According to other embodiments, the light guide 80 may include a plurality of layers over a substrate that is glass or plastic, such as polycarbonate, PET, etc. In these embodiments, the turning microstructure may be formed on a turning film over the substrate, such a UV-embossed resin, or an inorganic coating etched to various shapes. The turning film could be chosen to have the same index of refraction as the substrate to form one optical body for the light guide 80.

In other embodiments, one or more additional optical layers, such as an optical isolation layer may be disposed on the substrate of the display panel 81, or display elements or interferometric modulators, to otherwise improve the optical performance of the display. For example, an optical isolation layer 85 may be provided between the light guiding portion 80 of the display and the interferometric modulators 81 to prevent the interferometric modulators from absorbing light propagating through the light guiding portion.

For example, the interferometric modulators are typically absorptive structures for light rays guided at an angle of 45-90 degrees measured from the normal to the display elements. Thus, some of the light propagating through the light guide 80 and incident on the interferometric modulators 81 at an oblique angle may be substantially absorbed by the interferometric modulators 81 after a sufficient number of reflections. In order to reduce, minimize, or prevent this loss of light due to absorption, the optical isolation layer 85 may be disposed between the light guide region 80 and the interferometric modulators. According to some embodiments, the optical isolation layer 85 advantageously has an index of refraction substantially lower than the light guide region 80, such that light traveling through the light guide 80 and striking the optical isolation film interface at an oblique or grazing angle, for example, greater than the critical angle (e.g., greater than 50° or 60°), will be totally internally reflected back into the light guiding region 80. In various embodiments, the optical isolation layer 85 comprises silicon dioxide, or fluorinated silicon dioxide. Other materials may be employed as well. As described herein, the geometric arrangement of the turning microstructure 82, and additional optical films on the substrate relative to the interferometric modulators may be selected to enhance the efficiency of the light guiding portion of the display, to further enhance the optical performance of the overall display, or provide other advantages.

The plurality of display elements 81 may be formed using any of a variety of manufacturing processes known to those skilled in the art to adhere one or more of the optical layers described herein on the glass or plastic substrate supporting the array of display elements. The glass or plastic substrate comprises a support layer upon which the display elements, such as an array of interferometric modulators, are fabricated. As disclosed herein, the substrate may be further used to support one or more optical layers of the display device.

In certain embodiments, the light guide 80 may comprise more than one layer. For such embodiments, the indices of refraction of the multiple optical layers comprising the light guiding portion 80 may in some embodiments advantageously be close such that light may be transmitted through the multiple optical layers without being substantially reflected or refracted. The light guide 80 may for example have an index of refraction of 1.52. As described above, the light guide 80 may comprise glass or polymeric material in certain embodiments.

Figure 9A:
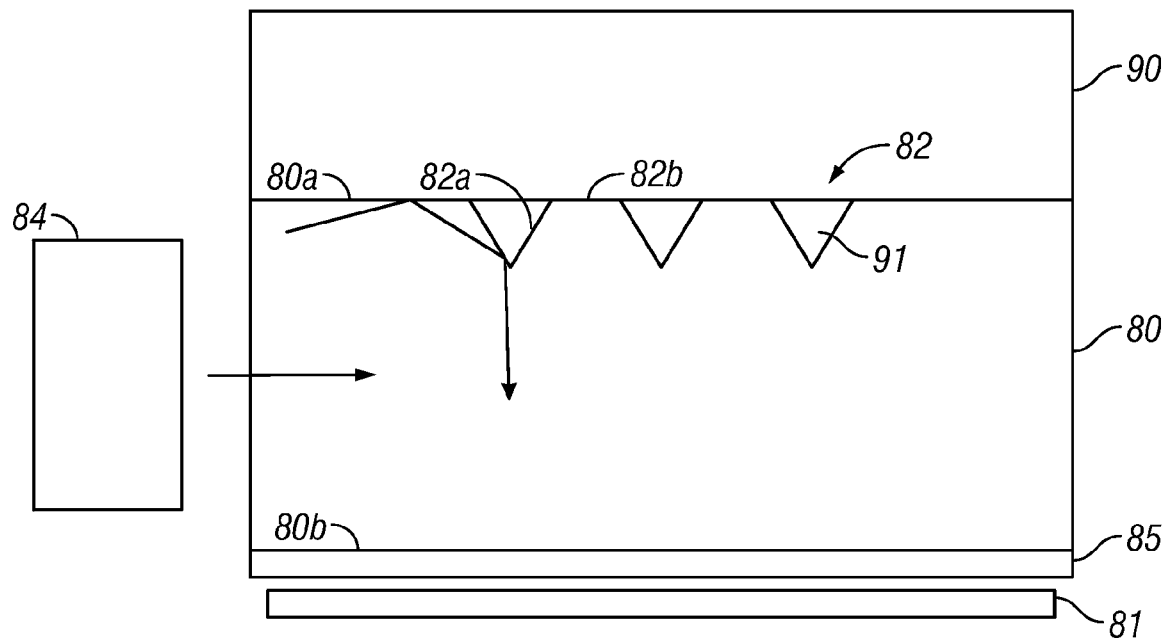
FIG. 9A is a cross section of an embodiment of a display device comprising a cover layer, a turning microstructure, a light guide panel and a display panel.

FIG. 9A is a cross-sectional view of a display device as shown in FIG. 8A, but with a cover layer 90 disposed over and attached to the light guide 80, such that the turning microstructure 82 is under the cover layer 90. The cover layer 90 comprises an optically transmissive material and is adhered to the light guide 80 such that a plurality of regions 91 is preserved between the cover and the plurality of indentations from turning features 82a. According to the embodiment shown in FIG. 9A, the regions 91 are open regions, or substantially filled with air. The cover layer 90 protects the turning microstructure 82 from the ambient and increases the life of the device by reducing wear. In certain embodiments, cover layer 90 may comprise a film stack including other functionalities, for example, additional layers for anti-glare, anti-reflection, anti-scratch, anti-smudge, diffusing, color filtering, or for introducing surface reflections (e.g., Fresnel reflections) of ambient light to reduce the display contrast ratio. Cover layer 90 also makes possible the easy deposition of the additional layers, since conventional adhesives used to laminate the above layers typically contaminate the turning microstructure 82 to the detriment of optimal performance.

The material of the cover layer 90 facilitates guiding of light within the light guide region 80 via total internal reflection. In particular, in various embodiments the portion of the cover layer 90 immediately adjacent to the lightguide 80 has an index of refraction smaller than that of the light guide 80. Since the index of refraction of the light guide 80 is greater than that of cover layer 90, light incident on the interface of the light guide 80 and the cover layer 90 at an angle greater than the critical angle will be reflected back into the light guiding region 80 and will continue to propagate along the light guiding region 80. Thus, light that is injected into the edge of light guide 80 is propagated along its length at least in part through total internal reflection due to the difference in index of refraction between the light guide 80 and the cover layer 90.

In various embodiments, the cover layer 90 is adhered to the light guide 80 such that the turning microstructure 82 is between the cover layer 90 and the light guide 80. The cover layer 90 may be adhered, laminated, pressed, fused etc., onto the light guide 80, or another layer between the cover layer 90 and the light guide 80, in a variety of ways. In certain embodiments of the invention, cover layer 90 is adhered to light guide 80 such that the plurality of open regions 91 is preserved. According to some embodiments, the open regions 91 are substantially filled with air and provide a difference in refractive index from the light guide 80 such that much of the light incident on the turning features 82a is turned and redirected towards the plurality of display elements 85. The interface between the light guide material and air provides total internal reflection for light incident on the interface at angles greater than the critical angle.

In some embodiments, the cover layer 90 may make direct contact with the light guide 80, and in particular embodiments, the cover layer 90 may make contact for over about 90% or more of the surface area of the first side 80a of the light guide 80, for example, on the elevated surfaces 82b of the light guide 80 between the facets 82a. In other embodiments, the cover layer 90 does not directly contact the light guide 80 but is attached by an intervening adhesive layer.

In some embodiments in which the cover layer 90 directly contacts the light guide 80, adhesion can be performed by ultrasonic or thermal bonding between the surface of cover layer 90 and the elevated surfaces 82b of light guide 80. In the case of thermal bonding, which involves the use of heat to bond two surfaces together, the surface of the light guide 80 and/or turning microstructure 82 can comprise cross-linked polymers and can initially be cured with UV light. The turning microstructure 82 may first be formed by UV-embossing, which typically involves replicating from a mold UV-curable epoxy on a substrate. This process of UV-embossing the turning microstructure 82 prior to adhering a cover film 90 to the elevated surfaces 82b of the microstructure 82 can prevent or reduce the likelihood that the surfaces of the light guide 80 and/or turning microstructure 82 melts during thermal bonding, and can thus help maintain their shape and light turning optical function.

According to another embodiment, the cover layer 90 may be directly adhered to light guide 80 by a preparation process that includes activating either the surface of cover film 90 or the surfaces of light guide 80 (e.g. turning microstructure 82), or both, with a plasma to improve adhesion, and subsequent UV radiation. For example, an oxygen plasma can be used to prepare the polymer surface, by first removing weak surface layers with the lowest molecular weight, while oxidizing the uppermost atomic layers of the polymer. UV radiation can be applied to promote formation of oxygen radicals, which can help break bonds and promote the cross linking of surface molecules. The consequent oxidation of the polymer causes an increase in polar groups, which enhances adhesion properties of the two polymer surfaces during the actual bonding step.

Figure 9B:
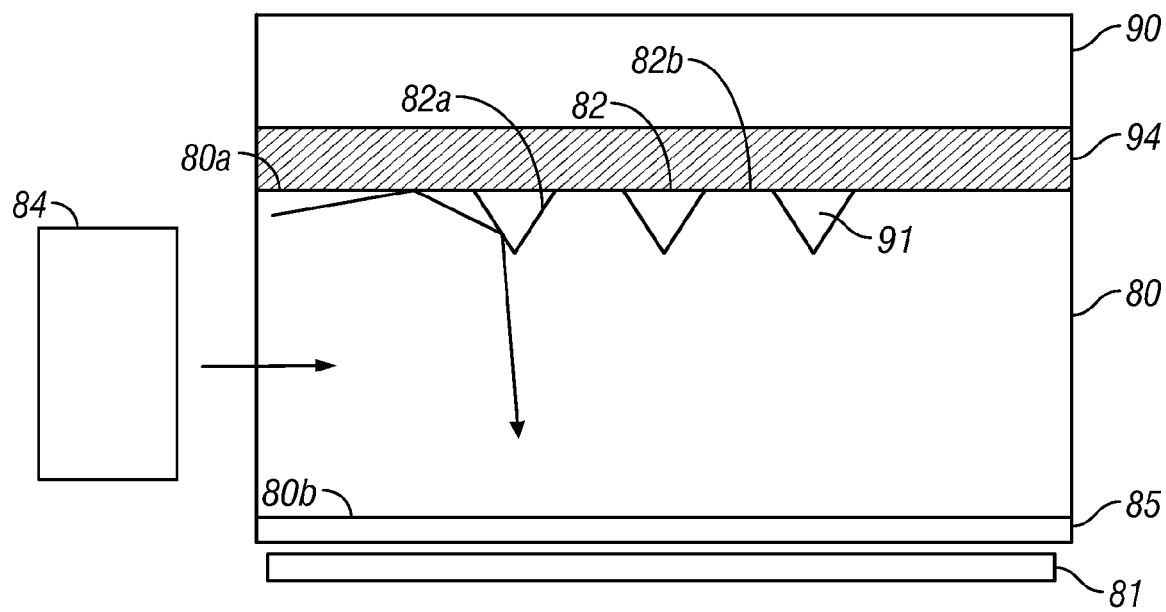
FIG. 9B is a cross section of another embodiment of a display device comprising a cover layer, an adhesive layer, a turning microstructure, a light guide panel and a display panel.
Figure 9C:
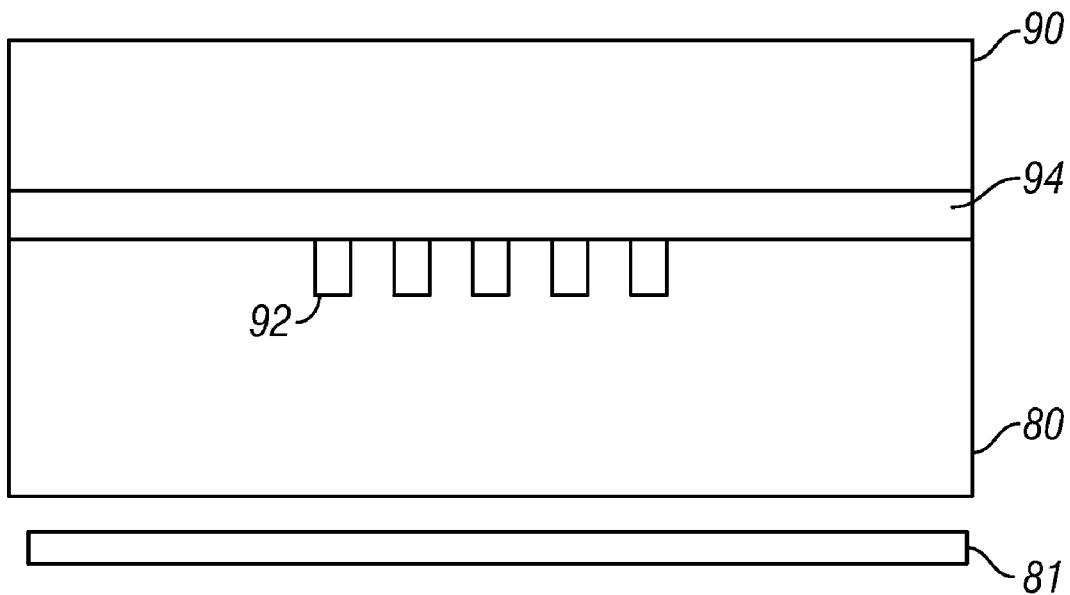
FIG. 9C is a cross section of another embodiment of a display device comprising a cover layer, an adhesive layer, a turning microstructure, a plurality of diffractive regions, a light guide panel and a display panel.

FIG. 9B shows an embodiment of a display device that includes a cover layer 90 attached to light guide 80 by an adhesive or interlayer 94 between the cover layer 90 and the turning microstructure 82. According to some embodiments, the interlayer 94 has an index of refraction that is smaller than that of the light guide 80 and can accordingly provide for total internal reflection of light within the light guide 80. Thus, use of such an interlayer 94 can advantageously increase material choices by eliminating restrictions on the index of refraction for the cover layer 90. Accordingly, the layer directly over interlayer 94 can be flexibly chosen for a desired functionality, e.g., for anti-glare, anti-reflection, color filtering, etc., regardless of its index of refraction. In some embodiments, the interlayer is very thin, e.g., less than 1/10 the size of the depth of feature or indentation of turning microstructure 82. Values outside these ranges are also possible. FIG. 9C shows an embodiment of a display device that includes a cover layer 90 attached to light guide 80 by an interlayer 94, except that turning microstructure 83 comprises binary gratings 92. The binary gratings 92 typically cover large areas so that they can diffract guided light outside the light guide 80. In some embodiments, the binary gratings provide open regions.

According to certain embodiments, the interlayer 94 has very low surface energy. For example, interlayer 94 can be a self-wetting adhesive. According to some embodiments, the interlayer 94 can have a surface tension of less than 35 dynes/cm. According to other embodiments, the interlayer 94 can have a surface tension of less than 25 dynes/cm. A self-wetting interlayer 94 can be applied or coated over a surface of the cover layer 90, and the cover layer 90 with the self-wetting interlayer 94 can be placed over the light guide 80 and turning microstructure 82. Simple pressure can be applied over the cover layer 90 to bond the surface of the interlayer 94 and surface of the light guide 80, due to the low surface energy of the interlayer. In some cases, a support frame placed over the cover layer 90 and the light guide 80 may be useful to provide the pressure for self-wetting to occur.

According to certain embodiments, the interlayer 94 is a polymer material with a low glass transition point ($T_g$) that is elastically deformable, such as a rubber or elastomeric gel-like material. The elastomeric properties can preserve the regions within the grooves 82a of the turning microstructure 82 by providing for reversal of any material ingress into the grooves 82a when the external force causing initial deformation is removed. In other words, the interlayer 94 is sufficiently elastically deformable as to avoid plastic flow into the grooves 82a upon external pressure, e.g., from accidental impact during device operation, that would prevent total internal reflection. The amount of cross linking could be increased to strengthen or rigidify the polymer, where desired, and render it less sensitive to temperature changes. According to certain embodiments, the polymer material comprises an elastomer material, such as silicone, polypropylene, or poly-isobutylene. According to certain embodiments, the interlayer comprises a siloxane backbone, including but not limited to polydimethyl siloxane, polydiethyl siloxane, polymethylphenyl siloxane, etc. According to some embodiments, the interlayer comprises a silicone elastomer. According to some embodiments, the interlayer comprises fluoropolymers, polypropylene and other amorphous hydrocarbon polymers with low surface energy to provide an optical bond with the light guide, and a refractive index lower than that of the rest of the light guide.

According to certain embodiments, the interlayer can comprises a polymer material with a $T_g$ that is lower than most operating temperatures and maintains its adhesive or elastomeric properties under most environmental conditions. For example, the low $T_g$ material can have a $T_g$ that is lower than 25° C., 0° C., −20° C., −40° C., etc. According to certain embodiments, the polymer material has a glass transition temperature below about 300° C. According to other embodiments, the polymer material has a glass transition temperature below about 200° C. According to other embodiments, the polymer material has a glass transition temperature below about 0° C.

According to some embodiments, the interlayer has an index of refraction that is sufficiently lower than that of the light guide to provide for total internal reflection. According to some embodiments, the interlayer has a sufficiently low surface energy to physically couple the cover to areas of the turning microstructure between the grooves. According to some embodiments, the interlayer has sufficiently elastomeric properties to preserve open regions in the turning microstructure and preserve total internal reflection. In some embodiments, the interlayer does not fill at least 50%, 60%, 70%, 80%, or 90% of the grooves, indentations or turning microstructure disposed across the light guide. Additionally, according to some embodiments, the interlayer does not fill substantially all of the region within the groove of the turning microstructure. For example, according to some embodiments, on average, the interlayer does not fill at least 50%, 60%, 70%, 80%, or 90% of the region within the grooves or turning microstructure. According to some embodiments, the interlayer has an index of refraction that is sufficiently lower than that of the light guide to provide for total internal reflection, a sufficiently low surface energy to physically couple the cover to areas of the turning microstructure between the grooves, and sufficiently elastomeric properties to preserve open regions in the turning microstructure and preserve total internal reflection.

According to certain embodiments, the thickness of the interlayer 94 is less than the height of the indentation of the turning microstructure. According to certain embodiments, the thickness of the interlayer 94 is less than ½, ¼, ⅛, ⅒, etc., the height of the indentations. For example, if an indentation of the turning microstructure is about 2 microns tall, the interlayer thickness can be about 200 nm thick. According to some embodiments, the thickness of the interlayer 94 can be 10 microns or more, 20 microns or more, 50 microns or more, or 100 microns or more.

Such an adhesive layer can be formed by conventional wet coating processes, such as spin, spray, dip, roll, inkjet, etc., which can typically form very thin films by employing dilute solutions of the coating material. After a very thin adhesive layer is formed on cover layer 90, the cover layer 90 with the thin adhesive can be placed over the light guide 80 with the application of pressure and temperature to provide contact with surfaces 82b of turning microstructure 82. The thin adhesive can then be cured with UV light or heat to bond the surface of cover layer 90 with surfaces of the turning microstructure 82.

In various embodiments, the films are made to be very thin to reduce or minimize the risk of excess adhesive material filling the grooves of the turning microstructure 82 after lamination of the adhesive material on the cover layer 90. Reducing or minimizing thickness of the adhesive material would keep the regions 91 within the grooves or indentations 82a open, and the optical performance of the display device optimized. Light over a wider range of angle total internally reflects if air having an index of 1.0 is within the indentation. Moreover, even if the filling of some adhesive material in the grooves 82a of the turning microstructure 82 occurs, the size of the grooves and amount of adhesive material can be configured such that the amount of adhesive material that falls into the grooves 82a may reduce the size of the open regions 91, without entirely filling the regions. Partial filling of the grooves 82a may decrease the likelihood that the grooves are visible to a viewer and/or may be factored into the design of the illumination system (e.g., in the selection of groove width).

For the embodiment of a very thin adhesive film, it can be advantageous that the adhesive material shows sufficient mechanical compliance so that optical contact can be increased or maximized. According to some embodiments, the adhesive material comprises a polymer material having a low glass transition point and is thus gel-like and deformable, but also having a high viscosity, or highly cross-linked networks. Preferably, the adhesive material comprises a soft polymer material that can conform easily to another surface, particularly a surface that has been UV-cured and is less compliant, and thus the adhesive material has a low molecular weight in various embodiments. Examples include acrylic pre-polymer mixtures, which have high viscosities, including for example polymethymethacrylate (PMMA), and poly(styrene-methylmethacrylate) (PS-PMMA), and other acrylic polymers. Other examples include polymer formulations typically used as pressure sensitive adhesives.

According to some embodiments, the index of refraction of the adhesive layer 94, which directly overlies the turning microstructure 83, has a lower index of refraction than that of the light guide 80 so that total internal reflection can occur within the light guide 80.

According to certain embodiments of a thicker adhesive, the thickness can be equal to or larger than the size of a feature 82a in the turning microstructure 82, and can range for example, from about 0.5 micron to about 50 microns in thickness. Since there is enough adhesive material to fill the grooves of the turning microstructure in this case, the adhesive material may be cured such that it does not flow or plastically deform when attaching the cover 90 to the light guide 80, in order to avoid the filling of grooves 82a with adhesive material during lamination. The process of forming a thicker adhesive is similar to the process of forming a thin adhesive as set forth above. However, the adhesive mixture in the embodiment of the thicker adhesive can be additionally cured to further reduce or minimize the flowability of the thick adhesive material. According to some embodiments, a thick adhesive material, such as a polymer material, is first coated onto or deposited over a cover layer 90. The thick adhesive material can be pre-cured to partially cross-link the polymer chains, and stop the flow of the adhesive. The cover layer with the thick adhesive can then be placed over the light guide panel 80 with the application of pressure and temperature to provide optical contact. The thick adhesive can then be cured a second time with UV light or heat to complete partial cross-linking and seal the surface of cover layer 90 with surfaces of the light guide 80. The pre-curing step helps avoid the filling or partial filling of grooves 82a of the turning microstructrure 82 with the thick adhesive material.

According to some embodiments, the adhesive materials comprise polymer materials with low glass transition points, highly cross-linked networked materials, or gel-like structures. According to some embodiments, the adhesive materials comprise silicones such as polydimethyl siloxanes, polydiethyl siloxanes, polymethylphenyl siloxanes, or acrylates with hydrocarbon side chains, such as t-butyl acrylate, or polyester materials, such as polytetramethylene ether glycol. Some embodiments provide the opportunity to further cross-link and fortify the adhesive, such as by including additional cross-linking density. As discussed above, the index of refraction of the thicker adhesive layer is lower than that of the light guide 80 in some embodiments. Moreover, the thicker adhesive can provide additional functionalities, such as optical diffusion, color filtering, mechanical shock absorption, etc.

According to another embodiment, the cover layer 90 can be solvent-welded, which includes exposing a surface of a cover layer 90 to a solvent that is chemically soluble with the surfaces of the cover layer 90 and of the light guide 80. The cover layer 90 with the solvent applied over a surface may be placed over the light guide 80. In some embodiments, application of pressure and temperature can increase optical contact and provides for inter-diffusion between the surface of the cover layer 90 and surfaces in areas 82b between the grooves. In certain embodiments, the light guide 80 can comprise a material that is cross-linked and UV-cured so that the solvent does not dissolve the features 82a of the turning microstructure 82.

According to various embodiments, the solvent comprises a liquid solvent. According to certain embodiments, the solvent comprises a polymerizable mixture. The polymerizable mixture may comprise a monomer and an initiator, unless the monomer itself can self-initiate. According to some embodiments, a solvent may further comprise molecular coupling agents, including tri-functional amino silanes (e.g., amino propyl tri-ethoxy silane), which activates the surfaces for bonding during lamination of the cover layer 90 to the light guide 80 and improves the seal between surfaces. An advantage of adding a molecular coupling agent, such as certain amino silanes, to a solvent applied to a cover layer 90 is that the amino groups of the molecular coupling agent, such as $NH_2$ groups, can more easily react with the material of the light guide 80. For example, a silane-based coupling agent may bond readily with surface hydroxyl groups of the light guide 80, and render the surface of the light guide 80 more active towards bonding with cover layer 90. Other coupling agents as known in the art, including various silicates and titanates, can accordingly be used to increase the interfacial bonds between the surfaces of the cover and the light guide 80.

Figure 10A:
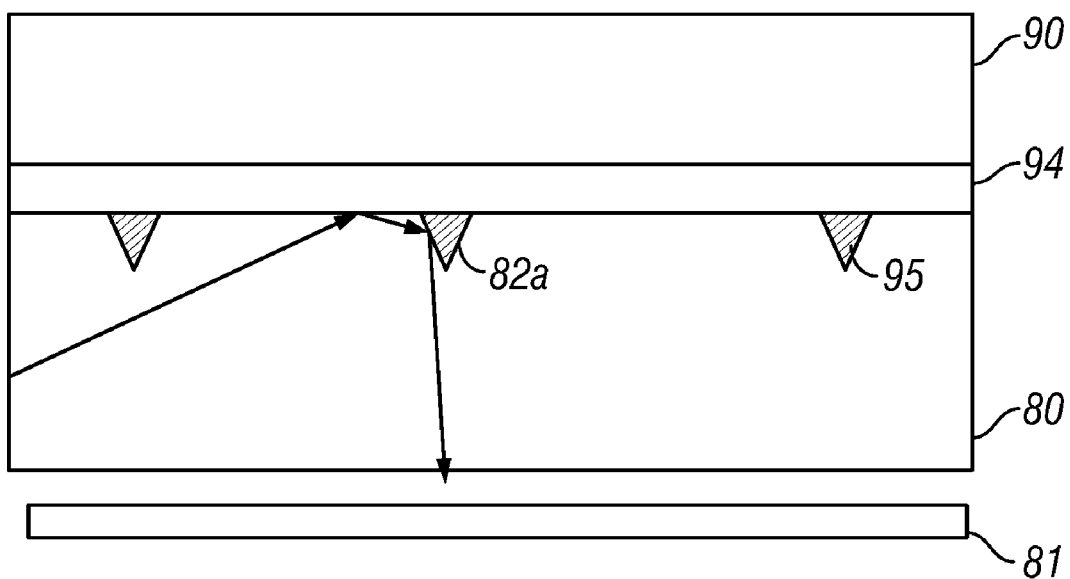
FIG. 10A is a cross section of an embodiment of a display device comprising a cover layer, an adhesive layer, a turning microstructure, a plurality of filled regions, a light guide panel and a display panel.

According to certain embodiments, the open regions 82a can be filled with air. However, according to other embodiments as shown in FIG. 10A, the regions 82a may be filled with a material to form filled regions 95. In some embodiments, the material may comprise a substantially porous material, or may comprise a material with an index of refraction that is substantially close to that of air so that light would be similarly directed by total internal reflection. According to another embodiment, the material may comprise a metallic material which acts as a mirror reflector and reduces or minimizes the need to trap air pockets between the light guide 80 and cover layer 90. Suitable deposition methods for the metallic material include direct vacuum coating followed by patterning using techniques known in the microfabrication field (e.g., photolithography followed by etching of excess metal layer, or lift-off techniques), or localized deposition such as by inkjet printing. While inkjet printing provides the advantage of achieving a line width as small as about 15 microns, other printing or deposition technologies may be used.

Figure 10B:
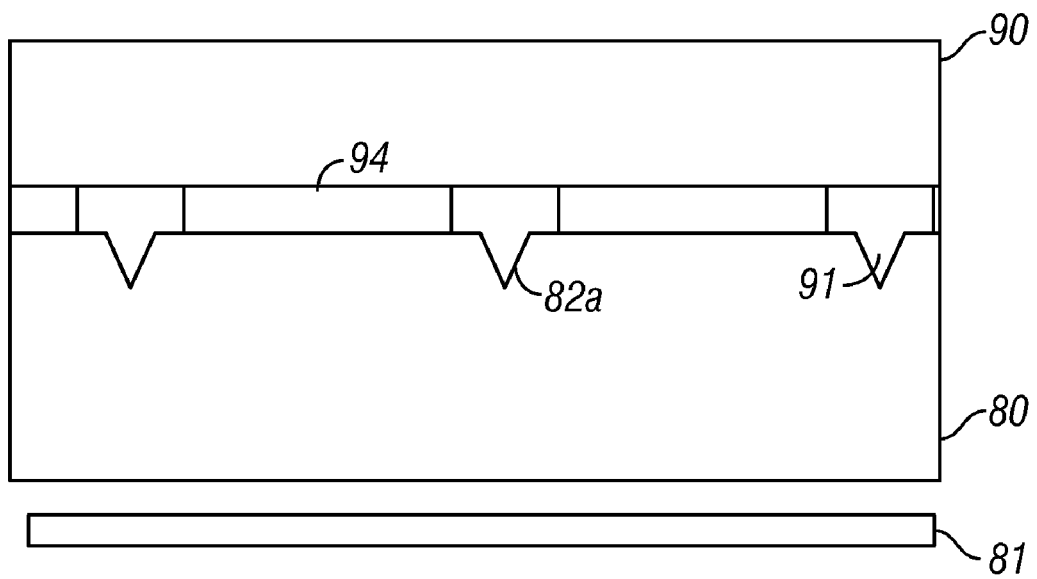
FIG. 10B is a cross section of another embodiment of a display device comprising a cover layer, an adhesive layer, a turning microstructure, a plurality of open regions, a light guide panel and a display panel.
Figure 10C:
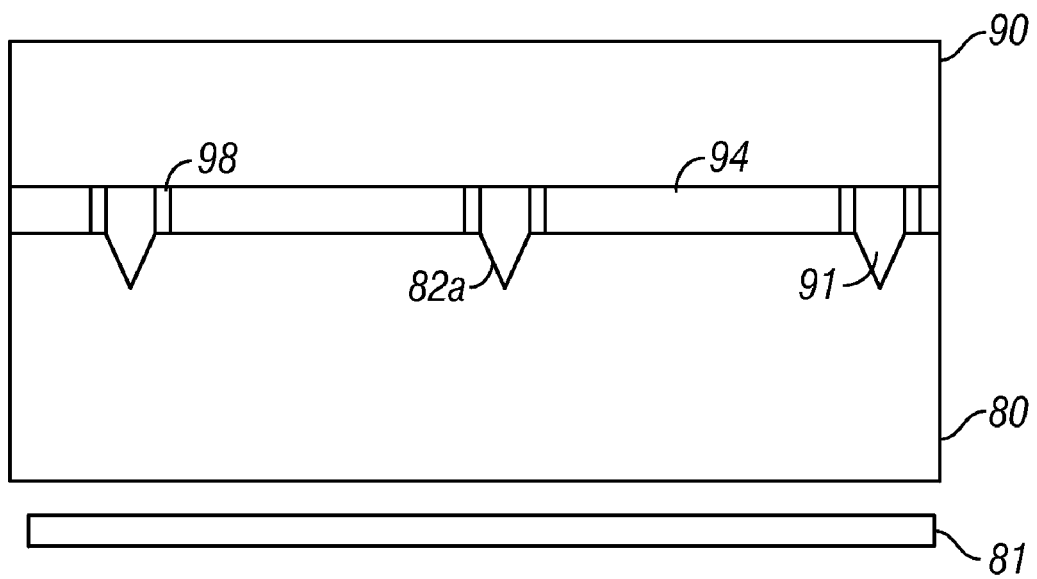
FIG. 10C is a cross section of another embodiment of a display device comprising a cover layer, an adhesive layer, a turning microstructure, a plurality of open regions, a light guide panel and a display panel.

According to some embodiments, as shown in FIG. 10B, the grooves 82a are not filled with a material, and the adhesive layer 94 is coated to produce a particular desired spatial arrangement, for example by inkjet printing, such that after the cover layer 90 and the lightguide 80 are bonded, the adhesive 94 will not flow into the grooves and thus preserve open regions 91. According to another embodiment shown in FIG. 10C, protruding structures 98 may be UV-embossed areas immediately adjacent to and separating the grooves 82a, to prevent adhesive material from entering the grooves during the lamination process and help preserve open regions 91. According to certain embodiments as shown in FIGS. 10B and 10C, the open regions 91 extend from the grooves 82a to the lower surface of cover layer 90.

According to another embodiment (not shown), the turning microstructure can comprise binary gratings as shown in FIG. 9C, but that are also filled. By inkjet printing a low refractive index material such as fluoroplastic, aerogel, sol-gel, etc., in the diffractive regions, and by maintaining the difference in refractive index constant between the light guide and the low index coating material, diffraction efficiency can be increased or optimized.

Figure 11:
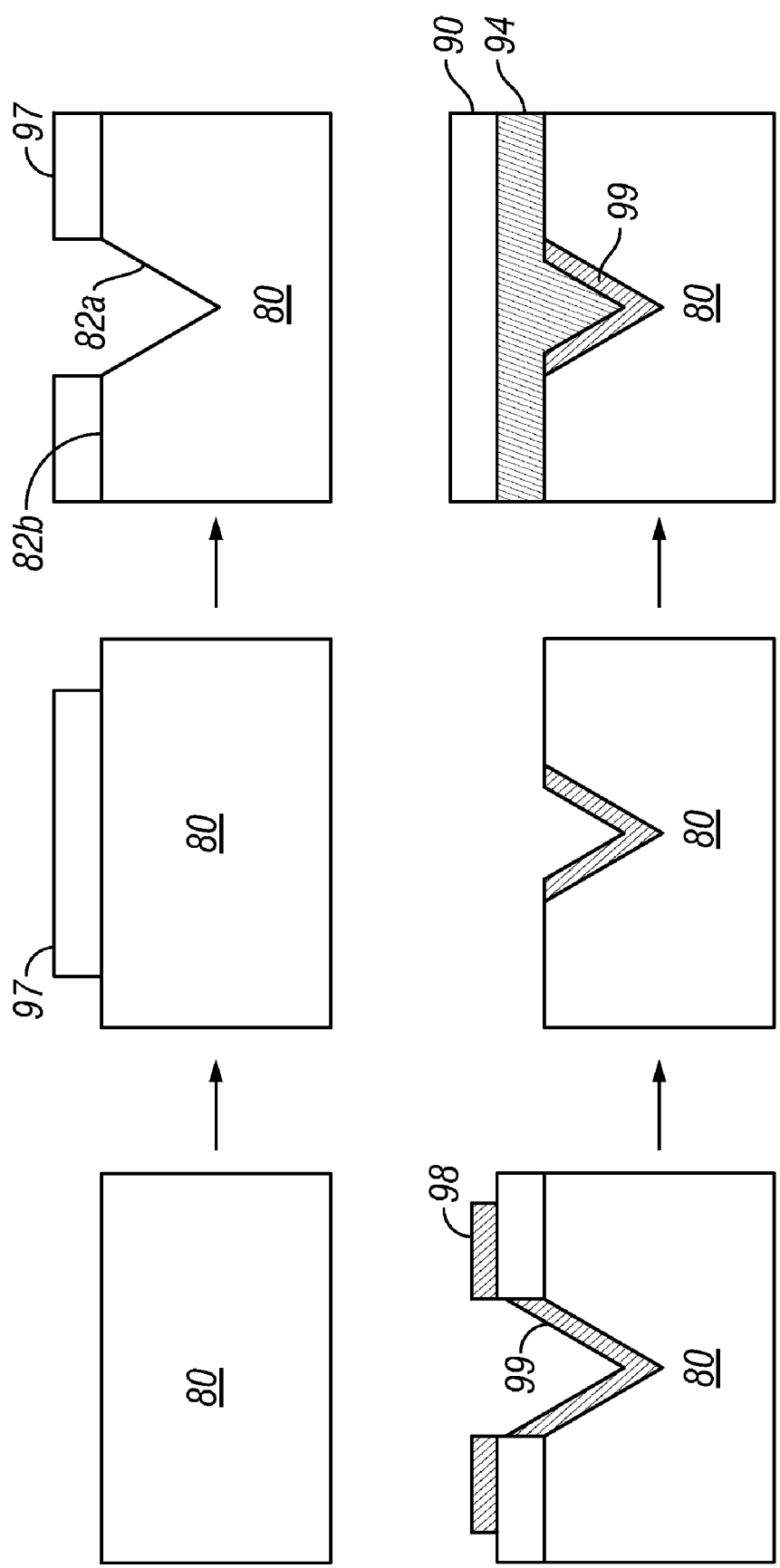
FIG. 11 is a schematic of cross sectional views of a method of forming a turning microstructure of a display device according to various embodiments.

The turning microstructures according to some embodiments can be formed by the process shown in FIG. 11. First, a dissolvable layer 97, such as photoresist, can be formed over the first side of the light guide 80. A plurality of grooves or indentations 82a can then be formed through the dissolvable layer 97 and into the first side of the light guide 80. A reflective material 99 can then be formed over the dissolvable layer 97 and light guide 80 so that the material fills the indentations 82a and lies over the dissolvable layer 97 in areas 82b between grooves 82a. According to some embodiments, reflective material 99 can be a layer of aluminum, silver, or other metals. According to some embodiments, the thickness of reflective material 99 is at least 50 nm. According to other embodiments, the thickness of reflective material 99 is at least 100 nm. Next, the dissolvable layer 97 is removed so that the overlying metal is also lifted off in areas 82b between the grooves 82a. According to some embodiments, the groove 82a can be lined or only partially filled with reflective material 99. That is, the reflective material 99 need not completely fill the groove 82a to provide reflection. Consequently, an overlying adhesive material need not be an elastomeric or elastically deformable material. As shown in the last block of FIG. 11, the space within the groove over the lining of reflective material 99 may be filled with material from an overlying interlayer 94. According to the illustrated embodiment, the space above the reflective material 99 need not be kept open because reflection would be preserved from the reflective material lining of the grooves. For this reason, the space within the grooves can also be completely filled with reflective material 99 according to other embodiments. According to other embodiments, groove 82a can first be lined or partially filled with reflective material 99, and additional planarizing steps can be subsequently taken to form a microstructure such that the grooves 82a are completely filled with the reflective material 99 (not shown).

A wide variety of variations are possible. Films, layers, components, and/or elements may be added, removed, or rearranged. Additionally, processing steps may be added, removed, or reordered. Also, although the terms "film" and "layer" have been used herein, such terms as used herein may include film stacks and multilayers. Such film stacks and multilayers may be adhered to other structures using adhesive or may be formed on other structures using deposition or in other manners.

Moreover, although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof In addition, while several variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. An illumination device comprising:
   a light guide having a first end for receiving light and configured to support propagation of light along the length of the light guide;
   a turning microstructure disposed on a first side of the light guide configured to turn light incident on the first side and to direct the light out a second opposite side of the light guide, wherein the turning microstructure comprises a plurality of indentations;
   a cover physically coupled to the light guide and disposed over the turning microstructure;
   an interlayer between the cover and the light guide, wherein the interlayer physically couples the cover to the light guide, wherein the interlayer comprises a surface energy of less than about 25 dynes/cm; and
   a plurality of open regions between the interlayer and the plurality of indentations;
   wherein the light guide has a first index of refraction and the interlayer has a second index of refraction and the second index of refraction is lower than the first index of refraction.

2. The illumination device of claim 1, wherein the plurality of indentations comprises a plurality of V-shaped grooves and the open regions comprise substantially triangular cross-sections.

3. The illumination device of claim 1, wherein the plurality of indentations comprises a plurality of grooves and the open regions comprise substantially trapezoidal cross-sections.

4. The illumination device of claim 1, wherein the turning microstructure comprises a diffraction grating.

5. The illumination device of claim 1, wherein the cover comprises a thickness in the range of about 10 microns to about 300 microns.

6. The illumination device of claim 1, wherein the interlayer contacts about 90% or more surface area of the first side of the light guide.

7. The illumination device of claim 1, wherein the plurality of open regions is preserved between the interlayer and the turning microstructure.

8. The illumination device of claim 1, wherein the light guide comprises a substrate, and wherein the turning microstructure is formed directly on the substrate.

9. The illumination device of claim 1, wherein the light guide comprises a substrate and a turning film, and wherein the turning microstructure is formed on the turning film.

10. The illumination device of claim 1, wherein the interlayer comprises a thickness less than the height of an indentation in the turning microstructure.

11. The illumination device of claim 1, wherein the interlayer comprises a cured polymer material having a glass transition point of less than about 200° C.

12. The illumination device of claim 1, wherein the interlayer comprises a cured polymer material having a glass transition point of less than about 0° C.

13. The illumination device of claim 1, wherein the interlayer comprises an elastomeric material.

14. The illumination device of claim 13, wherein the interlayer comprises a siloxane backbone.

15. The illumination device of claim 13, wherein the interlayer comprises a silicone, polypropylene, or poly-isobutylene.

16. The illumination device of claim 1, wherein the cover further comprises an anti-glare film.

17. The illumination device of claim 1, further comprising an optical layer having a low refractive index between the second side of the light guide and the plurality of display elements.

18. The illumination device of claim 1, wherein the open regions are filled with air.

19. The illumination device of claim 1, wherein the cover further comprises an anti-static film.

20. The illumination device of claim 1, wherein the cover further comprises an anti-smudge film.

21. The illumination device of claim 1, wherein the cover further comprises a color filter.

22. The illumination device of claim 1, wherein the cover further comprises a touch panel.

23. A method of manufacturing an illumination device comprising:
   providing a light guide having a first end for receiving light and configured to support propagation of light along the length of the light guide, said light guide having turning microstructure disposed on a first side thereof that is configured to turn light incident on the first side and to direct the light out a second opposite side of the light guide, wherein the turning microstructure comprises a plurality of indentations;
   providing a cover disposed over the turning microstructure; and
   physically to the light guide by an interlayer such that a plurality of open regions are between the interlayer and the plurality of indentations,
   wherein the interlayer comprises a surface energy of less than about 25 dynes/cm, and
   wherein the light guide has a first index of refraction and the interlayer has a second index of refraction and the second index of refraction is lower than the first index of refraction.

24. The method of claim 23, wherein the interlayer comprises an elastomeric material.

25. The method of claim 23, wherein the interlayer comprises a thickness of about 1/10 of the height of an indentation in the turning microstructure.

26. The method of claim 23, wherein the interlayer comprises a polymer material with a glass transition point of less than about 200° C.

27. The method of claim 23, wherein the interlayer comprises a polymer material with a glass transition point of less than about 0° C.

28. The method of claim 23, wherein forming the plurality of indentations comprises forming a plurality of triangular grooves.

29. The method of claim 23, wherein forming the plurality of indentations comprises forming a plurality of trapezoidal grooves.

30. The method of claim 23, wherein forming the plurality of indentations comprises forming a diffraction grating.

31. An illumination device comprising:
   a means for guiding light having a first end for receiving light and configured to support propagation of light along the length of the light guiding means;
   a means for turning light disposed on a first side of the light guiding means configured to turn light incident on the first side and to direct the light out a second opposite side of the light guiding means, wherein the turning means comprises a plurality of means for reflecting light;
   a means for covering physically coupled to the light guiding means and disposed over the turning means;
   a means for physically coupling between the covering means and the light guiding means, wherein the coupling means physically couples the covering means to the light guiding means, and the coupling means comprises a surface energy of less than about 25 dynes/cm; and a plurality of open regions between the coupling means and the plurality of reflecting means;

wherein the light guiding means has a first index of refraction and the coupling means has a second index of refraction and the second index of refraction is lower than the first index of refraction.

32. The illumination device of claim 31, wherein the light guiding means comprises a light guide, or the turning means comprises a turning microstructure, or the covering means comprises a cover, or the coupling means comprises an interlayer, or the reflecting means comprises indentations.

* * * * *